(12) United States Patent
Nakagawa et al.

(10) Patent No.: US 8,549,063 B2
(45) Date of Patent: Oct. 1, 2013

(54) SYSTEM AND METHOD FOR PROVIDING SERVICE

(75) Inventors: Ikuo Nakagawa, Tokyo (JP); Hidemi Hirai, Tokyo (JP)

(73) Assignee: Intec Inc., Toyama-shi (JP)

( * ) Notice: Subject to any disclaimer, the term of this patent is extended or adjusted under 35 U.S.C. 154(b) by 0 days.

(21) Appl. No.: 13/540,846

(22) Filed: Jul. 3, 2012

(65) Prior Publication Data
US 2012/0331031 A1    Dec. 27, 2012

Related U.S. Application Data

(63) Continuation of application No. 12/339,728, filed on Dec. 19, 2008, now Pat. No. 8,239,507.

(30) Foreign Application Priority Data

Dec. 27, 2007  (JP) .................................. 2007-336981

(51) Int. Cl.
*G06F 15/16*   (2006.01)
(52) U.S. Cl.
USPC .......................... 709/201; 709/205; 709/229
(58) Field of Classification Search
USPC .................................................. 709/205, 209
See application file for complete search history.

(56) References Cited

U.S. PATENT DOCUMENTS

| | | |
|---|---|---|
| 6,826,610 B1 | 11/2004 | Sakakura |
| 7,191,217 B2 | 3/2007 | Tanabe et al. |
| 2003/0070163 A1 | 4/2003 | Kroesa et al. |
| 2005/0240621 A1 | 10/2005 | Robertson et al. |
| 2007/0245409 A1 | 10/2007 | Harris et al. |

FOREIGN PATENT DOCUMENTS

| | | |
|---|---|---|
| EP | 1 215 575 A2 | 6/2002 |
| JP | 11-112541 A | 4/1999 |
| JP | 2002-016645 A | 1/2002 |
| JP | 2004-310166 A | 11/2004 |
| JP | 2006-040180 A | 2/2006 |
| WO | WO 02/054698 A2 | 7/2002 |
| WO | WO 03/034259 A1 | 4/2003 |
| WO | WO 2005/029346 A1 | 3/2005 |
| WO | WO 2006/028520 A1 | 3/2006 |
| WO | WO 2007/126837 A2 | 11/2007 |

OTHER PUBLICATIONS

B. Golden, "Virtualization for Dummies," Dec. 2007 (according to Wiley Publishing homepage), pp. 20-31, 60-81, 86-89 and 223-241.
Nikkei BP Mook: Subete Wakaru Kasuoka Taizen (Nikkei BP magazine book: All About Virtualization) edited by IT Pro, published Oct. 20, 2007 by Nikkei Business Publications, Inc., pp. 24-30, 106-109, 124-129, 130-135, 155-160 and 222-229.
Nikkei BP Mook: Subete Wakaru Kasuoka Taizen (Nikkei BP magazine book: All About Virtualization) edited by IT Pro, published Oct. 20, 2006 by Nikkei Business Publications, Inc., pp. 8-9, 14-20, 38-41, 55-64, 80-85, 126-137, 157-163, and 176-184.

*Primary Examiner* — Yves Dalencourt
(74) *Attorney, Agent, or Firm* — Foley & Lardner LLP

(57) ABSTRACT

A system comprises a service anchor apparatus having a unit configured to hold an original of an application program for providing a service; an end-user accommodation apparatus having a unit configured to connect with a terminal of an end user; and a relay apparatus located on a route between the service anchor apparatus and the end-user accommodation apparatus. The system creates, via the relay apparatus, a copy of the application program in the end-user accommodation apparatus, the original of the application program being held by the service anchor apparatus, and the end-user accommodation apparatus runs the copy of the application program, thereby providing the service to the terminal of the end user.

19 Claims, 22 Drawing Sheets

SYSTEM AND METHOD FOR PROVIDING SERVICE

CROSS-REFERENCE TO RELATED APPLICATIONS

This application is a Continuation of U.S. application Ser. No. 12/339,728, filed Dec. 19, 2008, which is based upon and claims the benefit of priority from prior Japanese Patent Application No. 2007-336981, filed Dec. 27, 2007, the entire contents of which are incorporated herein by reference.

BACKGROUND OF THE INVENTION

1. Field of the Invention

The present invention relates to a system for providing service to an end-user terminal by means of servers like data centers. The data centers may be arranged in plural layers via a network.

2. Background

In recent years, the load on networks has increased due to large-volume contents becoming widespread, and problems including deterioration in response and decrease in communication speed have become serious. As a scheme to solve those problems, a CDN (Content Delivery Network) technique has attracted attention that is configured to distribute servers geographically or on a backbone basis instead of placing them at one site and to mirror identical contents by many servers.

For example, as shown in WO 02/054698, a CDN developed by Akamai Technologies, Inc., USA, comprises: a CDN entry point that operates instead of a content provider to be an origin; each edge node that functions as a streaming server for many end users; and a reflector node that is located in an intermediate layer between an entry point and an edge node, in order to deliver live streams as contents to end users, and when an end user is directed to an edge node that is not yet receiving a desired stream, the edge node issues a subscription request to a set of reflector nodes. If the reflector node(s) are already receiving the desired stream, the reflector node(s) send it to the requesting edge node, and if the reflector node(s) are not already receiving the desired stream, the edge node issues the subscription request up the hierarchy, ultimately reaching the entry point(s). This configuration allows the CDN to efficiently deliver the contents.

Contents that can be delivered by the above-described technique are, however, limited to data such as a video stream. In the CDN, even if a software program was delivered, a program to be downloaded to a terminal of an end user and to run in the terminal would be transmitted from a CDN entry point to an edge node via a reflector node, and transferred from the edge node to an end-user terminal, as a mere data (in the form of a file). The known CDN technique can efficiently deliver contents while avoiding load concentration on a site of a content provider, but its subject is substantially limited to data delivery.

SUMMARY OF THE INVENTION

In methods and systems consistent with the invention, a service may be efficiently provided by distributing end-user terminals' use of an application that runs on a server, in a system configured such that a plurality of servers are hierarchically connected.

The inventors consider that services desired to be provided to end users may include not only one that delivers data to an end-user terminal to be used in the terminal, but also an interactive (two-way) one or one whose circumstances change significantly with time, such as an online fighting game or a real-time questionnaire, that is realized by an end-user terminal accessing a server to use server software. It may be desirable to decrease load concentration on a service providing site for those services as well.

A system for providing service consistent with the invention may comprise: a service anchor apparatus having a unit configured to hold an original of an application program for providing a service; an end-user accommodation apparatus having a unit configured to connect with a terminal of an end user; and a relay apparatus located on a route between the service anchor apparatus and the end-user accommodation apparatus.

The system may include a mechanism configured to create, via the relay apparatus, a copy of the application program in the end-user accommodation apparatus, the original of the application program being held by the service anchor apparatus, and the end-user accommodation apparatus runs the copy of the application program, thereby providing the service to the terminal of the end user.

In a computer usable medium having computer readable program codes embodied therein to be incorporated into a computer that may be installed with virtual middleware, whereby the computer functions as the service anchor apparatus, the computer readable program codes consistent with the invention may comprise: a code module causing the computer to hold an original of an application program for providing a service; a code module causing the computer to receive a request for the application program from the end-user accommodation apparatus; and a code module causing the computer to perform an operation in response to the request, in order to create a copy of the application program in the end-user accommodation apparatus via the relay apparatus.

In a computer usable medium having computer readable program codes embodied therein to be incorporated into a computer that may be installed with virtual middleware, whereby the computer functions as the end-user accommodation apparatus, the computer readable program codes consistent with the invention may comprise: a code module causing the computer to acquire information for accessing the service anchor apparatus, in response to a determination that the service is provided to a terminal of an end user, the terminal being connected with the end-user accommodation apparatus; a code module causing the computer to transmit a request for the application program toward the service anchor apparatus based on the information; and a code module causing the computer to run a copy of the application program, the copy being created in the end-user accommodation apparatus via the relay apparatus in response to the request, thereby providing the service to the terminal of the end user.

In a computer usable medium having computer readable program codes embodied therein to be incorporated into a computer that may be installed with virtual middleware, whereby the computer functions as the relay apparatus, the computer readable program codes consistent with the invention may comprise: a code module causing the computer to hold a copy of the application program, the copy being created in the relay apparatus by the service anchor apparatus or by another relay apparatus closer to the service anchor apparatus; and a code module causing the computer to use the copy to create a further copy of the application program in the end-user accommodation apparatus or in another relay apparatus closer to the end-user accommodation apparatus.

As described hereafter, other aspects of the invention exist. Thus, this summary of the invention is intended to provide a few aspects of the invention and is not intended to limit the scope of the invention described and claimed herein.

BRIEF DESCRIPTION OF THE DRAWINGS

The accompanying drawings are incorporated in and constitute a part of this specification. The drawings exemplify certain aspects of the invention and, together with the description, serve to explain examples consistent with some principles of the invention.

DETAILED DESCRIPTION

Figure 1:
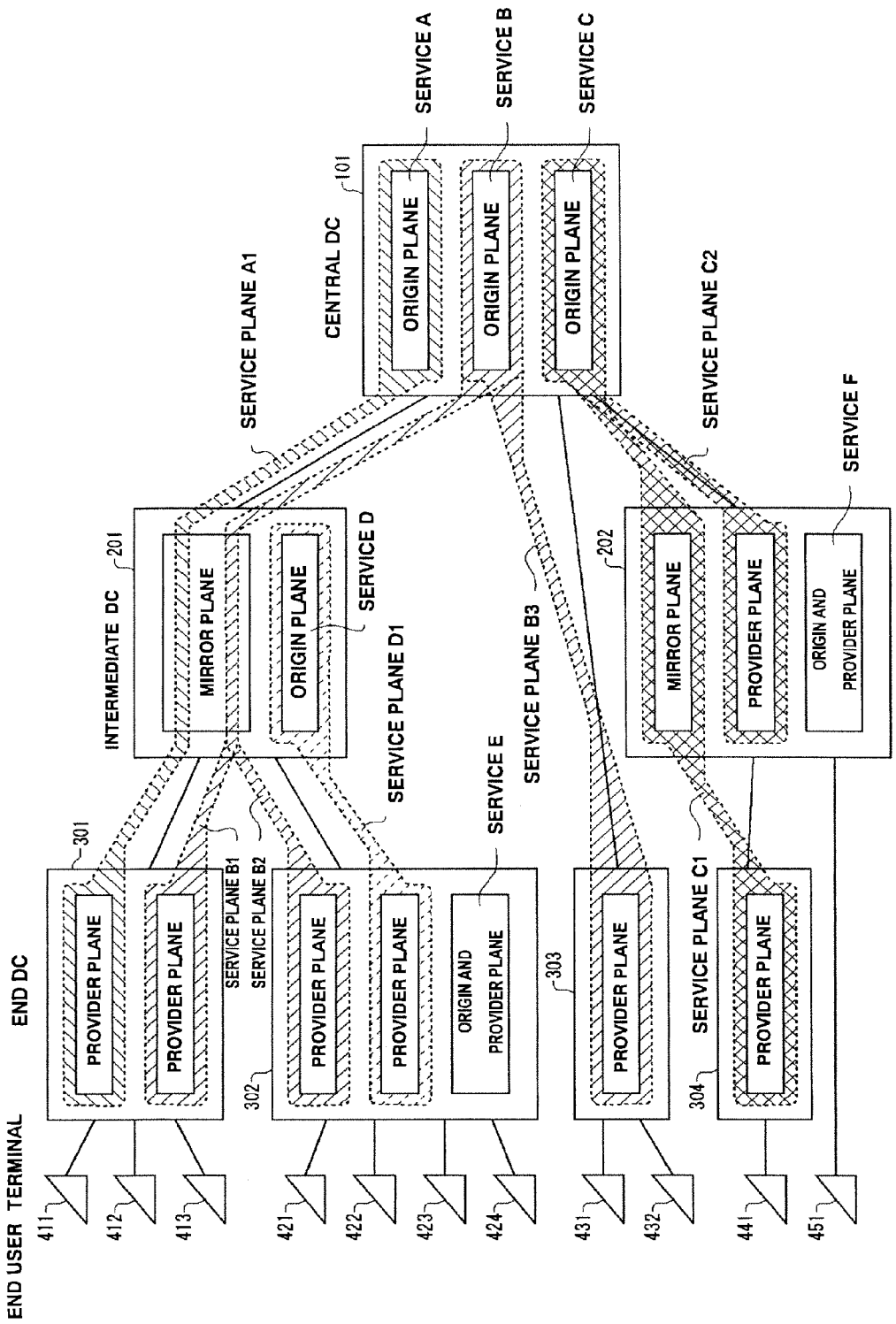
FIG. 1 shows an example for explanation concerning an entire configuration of a service provision system according to an embodiment consistent with the invention.

The following detailed description refers to the accompanying drawings. Although the description includes exemplary implementations, other implementations are possible and changes may be made to the implementations described without departing from the spirit and scope of the invention. The following detailed description and the accompanying drawings do not limit the invention. Instead, the scope of the invention is defined by the appended claims.

General Description

In the known technique as in WO 02/054698, entry points, edge nodes, and reflector nodes of the CDN are all operated by an identical operator (Akamai Technologies, Inc.) though located in a distributed manner across the world, and content providers can only provide contents to entry points from outside the formed CDN. Thus, for example, even if there is a site of a content provider near a place where a reflector node is located or near a place where an edge node is located, contents cannot be delivered to end users without being transmitted to a far CDN entry point.

In the known technique, since each content provider only delivers independently using the CDN, contents from a plurality of content providers cannot be brought together on one menu to be provided to end users, or contents cannot be provided to end users with the content programming changed in the middle of a delivery route (e.g. with an original commercial being superimposed, at a site in the middle of a delivery route, into a video delivered from a content provider).

While the known CDN technique is directed to a content delivery in the Internet, contents delivery by cable TV in the known technique also has similar problems. In the existing cable TV, program suppliers (e.g. Disney, all-sports channels, key TV stations in Tokyo, or the like) deliver TV programs (contents) via satellite or other delivery carriers to local cable TV stations that are accessed by end users. This delivery is only performed independently by each program supplier on each cable TV station, and neither change of the content programming nor addition of a program on the way of delivery can be realized.

In addition to programs provided by program suppliers, which is a nationally unified service, local cable TV stations can provide their original programs to end users using channels called community channels. However, in the known cable TV system, local stations cannot deliver to a regional block (e.g. a prefecture level of Toyama, Ishikawa, or the like) comprising some neighboring cable TV stations (e.g. a city level of Uotsu, Namerikawa, Toyama, Takaoka, or the like) the regional block's original programs (e.g. a broadcast of a local tournament of the senior high school baseball, or the like).

Therefore, some methods and systems consistent with the invention may aim for allowing a server located on the way of delivery formed such that a plurality of servers are hierarchically connected to additionally provide an original service, and/or allowing a server accessed by an end user to provide together a service whose providing origin is one server and a service whose providing origin is another server. Such arrangement may realize a mechanism that can give independence to a menu of services provided by an operator of each server.

Yet another problem in the known technique is that content delivery to end users depends much on systems of delivery carriers and Internet service providers (Akamai Technologies, Inc. in the above example). Under such circumstances, content providers can get content usage histories (profiles) of end users only on a contract basis. Also in the known cable TV technique, only each cable TV station can keep track of the usage among end users, and program suppliers cannot get profiles of end users.

Therefore, some methods and systems consistent with the invention may aim for realizing a mechanism in which, even if different operators operate each server located on a delivery route formed such that a plurality of servers are hierarchically connected, an operator who is an origin of providing a particular service can automatically acquire usage information on the particular service for end users.

An example of a service provision system consistent with the invention comprises: a service anchor apparatus having a unit configured to hold an original of an application program for providing a service; an end-user accommodation apparatus having a unit configured to connect with a terminal of an end user; and a relay apparatus located on a route between the service anchor apparatus and the end-user accommodation apparatus, wherein the system includes a mechanism configured to create, via the relay apparatus, a copy of the application program in the end-user accommodation apparatus, the original of the application program being held by the service anchor apparatus, and the end-user accommodation apparatus runs the copy of the application program, thereby providing the service to the terminal of the end user.

In this configuration, not only data to carry out a service but also a server program itself moves from the service anchor apparatus to the end-user accommodation apparatus, and therefore this can decrease load concentration on the service anchor apparatus and efficiently provide end users with various services including interactive online applications, services in which an activity changes depending on time of being connected, and the like.

The example of a service provision system consistent with the invention may be configured such that virtual middleware is installed in the service anchor apparatus, the end-user accommodation apparatus, and the relay apparatus, and an identical copy of the application program can run on any one of the apparatuses.

This allows the application program to be moved from the service anchor apparatus to the end-user accommodation apparatus by using virtualization technology. Since virtual middleware is installed in all of the apparatuses, the relay apparatus can be caused to function also as a second service anchor apparatus on an identical apparatus as described later, and original services can be additionally provided from the middle of a delivery route.

In the example of a service provision system consistent with the invention, the mechanism may create, while the original of the application program is being run on the service anchor apparatus, a copy of the running application program in the relay apparatus; while the copy of the application program is being run on the relay apparatus, create a further copy of the running application program in the end-user accommodation apparatus; and causes the further copy of the application program to start running on the end-user accommodation apparatus, taking over running of the original of the application program, whereas the original of the application program continues to run on the service anchor apparatus.

This allows dynamic migration of a program, and can realize a situation where while an original of a server program is running on the service anchor apparatus, a copy of the server program running in the same manner extends to each end-user accommodation apparatus (near end-user terminals) to provide a service to the end-user terminals.

In the example of a service provision system consistent with the invention, the end-user accommodation apparatus may further have a unit configured to acquire information for accessing the service anchor apparatus, in response to a determination that the service is to be provided to a terminal of an end user with which the end-user accommodation apparatus connects, and the mechanism may include: a unit configured in the end-user accommodation apparatus to request the application program from the service anchor apparatus, based on the information; a unit configured in the service anchor apparatus to create a copy of the application program in the relay apparatus, in response to the request; and a unit configured in the relay apparatus to create a further copy of the application program in the end-user accommodation apparatus or in another relay apparatus closer to the end-user accommodation apparatus, using the copy created in the relay apparatus.

Consequently, when the operator of the end-user accommodation apparatus determines that a particular service is to be provided to an end user or end users under the end-user accommodation apparatus, an application program to implement the service can be migrated from the service anchor apparatus of the particular service to the end-user accommodation apparatus via the relay apparatus.

In the above example of a service provision system, the unit for the end-user accommodation apparatus to acquire the information may include referring to the information stored in a service box, the service box being installed in the end-user accommodation apparatus in response to the determination. The service box may store the information and software to implement the unit for requesting the application program from the service anchor apparatus, and may be equipped with resources to be used in providing the service to the terminal of the end user.

Consequently, when the operator of the end-user accommodation apparatus determines that a particular service is to be provided to an end user or end users under the end-user accommodation apparatus, simply installing a service box of the particular service allows the operator to automatically acquire from the service anchor apparatus an application program that implements the service by means of the software incorporated in the service box, and to provide the particular service to the end-user terminal(s) using the program and required resources. Thus reducing management burdens during operation on end operators being near end users facilitates the start and discontinuation of service provision reflecting the needs of end users, and makes it easier for end operators to give independence to their menus of provided services.

In the above example of a service provision system, the relay apparatus may have a unit configured to hold an original of a second application program for providing a second service other than said service, and function as a second service anchor apparatus.

In addition to relaying the provision of a particular service from the upper-level service anchor apparatus to the end-user accommodation apparatus being at a lower level of the relay apparatus, the above allows the operator of the relay apparatus to deliver a different and original service to the end-user accommodation apparatus being at a lower level of the relay apparatus, by the relay apparatus becoming an origin of providing the different service. In this way, an operator of a way station on a delivery route of one service can be a providing origin of another service independently and equivalently, and this allows each end-user accommodation apparatus to flexibly choose from various services a service that matches the needs of end users being under each end-user accommodation apparatus and to provide a chosen set of services.

In this regard, the relay apparatus that functions as the second service anchor apparatus may comprise: first software to implement the mechanism for creating a copy of the application program associated with said service in the end-user accommodation apparatus, the original of the application program being held by the service anchor apparatus; second software to create a copy of the second application program associated with the second service in the end-user accommodation apparatus where provision of the second service to a terminal of an end user is determined, the original of the second application program being held by the relay apparatus; and a unit configured to allocate at least a part of resources that have been used by the first software to the second software.

This allows resources to be commonly used and shared in an identical apparatus between a function as a way station on a delivery route of one service and a function as a delivery origin of another service, so that service providing origins can be increased without having to expand from scratch for a new service in addition to existing delivery routes and resources.

On the other hand, in the above example of a service provision system, the relay apparatus may have a unit configured to connect with a terminal of a second end user other than said end user, and function as a second end-user accommodation apparatus.

In addition to relaying the provision of a particular service from the upper-level service anchor apparatus to the end-user accommodation apparatus being at a lower level of the relay apparatus, the above allows the operator of the relay apparatus to accommodate a terminal of an end user directly under the relay apparatus and provide a service thereto. The service to be provided directly to an end user may be the particular service whose providing origin is the upper-level service anchor apparatus or may be a different and original service whose providing origin is the relay apparatus itself. This allows each end-user accommodation apparatus to have more choices of services that can be provided to end users being under each end-user accommodation apparatus, and can increase flexibility and independence.

In this regard, the relay apparatus that functions as the second end-user accommodation apparatus may comprise: first software to implement the mechanism for creating a copy of the application program associated with the service in the end-user accommodation apparatus, the original of the application program being held by the service anchor apparatus; second software to implement a unit for acquiring information for accessing the service anchor apparatus in response to a determination that the service is to be provided to a terminal of the second end user and a unit for running the copy of the application program, thereby providing the service to the terminal of the second end user; and a unit configured to allocate at least a part of resources that have been used by the first software to the second software.

This allows resources to be commonly used and shared in an identical apparatus between a function as a way station on a delivery route of a service and a function to provide a service to end users, so that service providing origins can be increased without having to expand from scratch for a new service in addition to existing delivery routes and resources.

In the example of a service provision system consistent with the invention, the service anchor apparatus may further have a unit configured to store information to specify the end-user accommodation apparatus and the relay apparatus, and the mechanism may include: a unit configured in the service anchor apparatus to create a copy of the application program in the relay apparatus with the information added to the copy; a unit configured in the relay apparatus to create a further copy of the application program in a copying destination that is the end-user accommodation apparatus or another relay apparatus closer to the end-user accommodation apparatus, the copying destination being determined with reference to the information.

This allows the service anchor apparatus to migrate the application program with an instruction specifying a delivery route of the application program, and allows each relay apparatus to migrate the program concerned to each end-user accommodation apparatus in accordance with the instruction. Giving, to the service anchor apparatus, control rights including the determination of a delivery route of a program as above allows an origin of providing a service to exercise centralized control over the delivery to all end-user accommodation apparatuses associated with the service, so that a change in service functions, data synchronization, and synchronization of the state of the program can be carried out more precisely.

In the example of a service provision system consistent with the invention, the relay apparatus may have: a unit configured to hold the copy of the application program created in the relay apparatus; a unit configured to check whether the copy of the application program is held or not, in response to receiving a request for the application program from a second end-user accommodation apparatus other than said end-user accommodation apparatus to the service anchor apparatus; a unit configured to transfer the request to the service anchor apparatus if the copy is not held; and a unit configured to otherwise use the copy held in the relay apparatus to create a further copy of the application program in the second end-user accommodation apparatus or in another relay apparatus closer to the second end-user accommodation apparatus.

This allows a program to be migrated from several way-station relay apparatuses to all end-user accommodation apparatuses without having to be migrated from one service anchor apparatus every time, and can reduce load concentration on the service anchor apparatus during program delivery.

In the above example of a service provision system, the mechanism may include a unit configured in the service anchor apparatus to create the copy of the application program in the relay apparatus with information added to the copy, the information indicating a period for which the copy is to be held, and the relay apparatus may hold the copy for the period, referring to the information.

This allows the service anchor apparatus, which is the service providing origin, to exercise general and centralized control also over how the copy of the application program to be migrated to the end-user accommodation apparatus is to be held in way stations of a delivery route.

In the above example of a service provision system, the system may include a second mechanism configured to create, via the relay apparatus, a copy of a second application program to provide a second service other than said service in the end-user accommodation apparatus or in a second end-user accommodation apparatus other than the end-user accommodation apparatus, and the relay apparatus may make the unit configured to hold the copy available for holding the copy of the second application program associated with the second service, after the period expires as to said service.

This allows resources to be commonly used and shared in an identical relay apparatus between a function as a way station on a delivery route of one service and a function as a way station on a delivery route of another service, so that service providing origins can be increased without having to expand from scratch for a new service in addition to existing delivery routes and resources.

In the example of a service provision system consistent with the invention, the end-user accommodation apparatus may further have a unit configured to acquire first information for accessing the service anchor apparatus and second information for accessing the relay apparatus, in response to a determination that the service is to be provided to a terminal of an end user with which the end-user accommodation apparatus connects, and the mechanism may include: a unit configured in the end-user accommodation apparatus to transmit a request for the application program to the relay apparatus, based on the second information; a unit configured in the relay apparatus to create a copy of the application program in the end-user accommodation apparatus or in another relay apparatus closer to the end-user accommodation apparatus, in response to the request; and a unit configured in the end-user accommodation apparatus to access the service anchor apparatus via the relay apparatus, based on the first information.

Alternatively or Additionally, the end-user accommodation apparatus may further have: a unit configured to receive a request for the application program from a second end-user accommodation apparatus that connects with a terminal of a second end user other than said end user; a unit configured to create, in response to the request, a copy of the application program in the second end-user accommodation apparatus or a relay apparatus closer to the second end-user accommodation apparatus; and a unit that functions as a relay apparatus being on a route between the service anchor apparatus and the second end-user accommodation apparatus. The second end-user accommodation apparatus may comprise: a unit configured to acquire first information for accessing the service anchor apparatus and second information for accessing the end-user accommodation apparatus, in response to a determination that the service is to be provided to a terminal of a second end user with which the second end-user accommodation apparatus connects; a unit configured to transmit the request to the end-user accommodation apparatus, based on the second information; and a unit configured to access the service anchor apparatus via the end-user accommodation apparatus's unit that functions as a relay apparatus, based on the first information.

Consequently, if beyond one end-user accommodation apparatus newly appears another end-user accommodation apparatus when viewed from the service anchor apparatus, a program can be migrated from the existing end-user accommodation apparatus that has become a way station on a delivery route to the end-user accommodation apparatus that newly appeared, without having to be migrated from the service anchor apparatus, and this can reduce load concentration on the service anchor apparatus during program delivery. On the other hand, because the end-user accommodation apparatus that appeared notifies the service anchor apparatus of its appearance, it can be under general and centralized control by the service anchor apparatus being the service providing origin, and thus precise synchronization may be achieved after the migration of the program.

In the example of a service provision system consistent with the invention, the service anchor apparatus may further have: a unit configured to store information to specify the end-user accommodation apparatus; a unit configured to hold an original of data that can be used by the service; and a unit configured to create a copy of the data to be received by the end-user accommodation apparatus, referring to the information. The end-user accommodation apparatus may receive the copy of the data and makes the copy of the data available to the copy of the application program in the end-user accommodation apparatus, thereby providing the service with regard to data chosen by the end user.

This allows data for use in service provision to be used in such a way that a copy of data being used in the service anchor apparatus is delivered to each end-user accommodation apparatus (near end-user terminals) and used therein. For example, as for data whose volume is relatively large like initial data, the service anchor apparatus may migrate (change a location of) a copy of the data with an instruction specifying a delivery route of the data, and each relay apparatus may migrate the data concerned to each end-user accommodation apparatus according to the instruction, as in the case of migrating a program, if desirable. For another example, as for data whose volume is relatively small like difference data (dynamic data) that represents a change from initial data, the service anchor apparatus may transmit a copy of the data by specifying only a destination end-user accommodation apparatus to which data is to be directed. In the latter case, each relay apparatus that may be in the system or outside the system can transmit the data received to a next relay apparatus that is autonomously determined based on the destination.

In the example of a service provision system consistent with the invention, the end-user accommodation apparatus may further have: a unit configured to request a latest version of data, an original of the data being held in the service anchor apparatus; to receive a copy of the latest version of the data in response to the request; and to store the copy of the data as data that can be used by the copy of the application program in the end-user accommodation apparatus; and a unit configured to cause the copy of the application program to refer to the original of the data held in the service anchor apparatus.

Consequently, when providing to an end user a service that uses data, the end-user accommodation apparatus can acquire the latest version of the data (e.g. data that is changing with time in the service anchor apparatus, data to be determined by reflecting the previous usage result of the end user, or the like). On the other hand, as for data that is not desired to be copied, the end-user accommodation apparatus can directly refer to the very data held by the service anchor apparatus. Therefore, appropriate data synchronization can be achieved.

In the example of a service provision system consistent with the invention, the end-user accommodation apparatus may further have: a unit configured to acquire identification information of the service anchor apparatus, in response to a determination that the service is to be provided to a terminal of an end user with which the end-user accommodation apparatus connects, and a unit configured to output usage information obtained through providing the service to the terminal of the end user, toward the service anchor apparatus based on the identification information, and the service anchor apparatus may record usage of the service for each end user based on the usage information outputted from the end-user accommodation apparatus. For example, the service anchor apparatus may have a unit for recording the usage information of each service for each end user, and input to the recording unit the usage information outputted from the end-user accommodation apparatus for the end user.

This allows the usage information for each end user to be automatically returned to the service providing origin, regardless of what kind of delivery scheme is used for providing the service or even if different operators operate each apparatus on a delivery route.

The principle of the invention may also be realized by methods performed by each of the apparatuses: the service anchor apparatus; the end-user accommodation apparatus; and the relay apparatus, which form a service provision system, or by a method performed by the whole service provision system. The principle of the invention may further also be realized by a program for causing a computer to function as each of the above apparatuses, or by a recording medium on which such program is recorded.

As explained above, according to various examples consistent with the invention, a platform having various unprecedented advantages can be proposed, for example, to the respective operators involved in service provision to end users.

DESCRIPTION WITH REFERENCE TO DRAWINGS

Exemplary embodiments of the above-described configuration will be described below with reference to the drawings.

A service provision system according to one embodiment consistent with the invention is a service platform technically based on a virtual architecture wherein a plurality of data centers (hereinafter referred to as "DC") are hierarchically connected to form hierarchically organized virtual space. Virtualization techniques used in the embodiment are described, for example, in "Nikkei BP MOOK: SUBETE WAKARU KASOUKA TAIZEN (Nikkei BP magazine book: All about Virtualization)" (edited by IT Pro, published in Oct. 30, 2006 by Nikkei Business Publications, Inc.).

A "service" to be provided in the embodiment will be described here. The provision of a "service" includes simple delivery of contents such as movies, dramas, music, advertisements, and games. In addition, content delivery added with two-way communication, such as answering questionnaire and ordering for shopping, can also be provided as a "service," and communication in which plural end users simultaneously participate, such as videophone conferences and online fighting games, can also be provided as a "service."

A "service" may be provided, in a form including a later-described software appliance, by a providing source of the service concerned (e.g. a content holder) to a data center that controls all areas to which the service is desired to be delivered (a later-described service anchor DC).

A data center (DC) may comprise a single server, or may comprise a server group, storage group, network devices, or the like, that are gathered in one place.

Operators of each DC are, for example, an Internet operator, a cable TV operator, a fixed phone operator, a mobile phone operator, or the like, and may be different from DC to DC.

An exclusive line may be laid between DCs, or they may be connected with a backbone network, such as the next generation network (NGN) or IP-CATV network, that meets conditions of broadband characteristics, bandwidth guarantee, or the like. The service provision system according to the embodiment can be built on neutral line environments, and can be used across telephone carriers, cable TVs, mobile-phone carriers, and the like.

A service provision system according to the embodiment includes a plurality of DCs, in which there may be the following three types of DC. That is, the above-mentioned virtual space may be hierarchically organized in three layers or more.

The first one is a "service anchor DC." A service anchor DC is a DC that holds an original of a program (a later-described software appliance) and/or data, which is passed to the system from a producer of a service or contents or one that is under a commission from the producer (a providing source of the service). In the system, a service anchor DC is a service providing origin, and there is one service anchor DC for each service. A later-described "origin plane" (O-plane) is incorporated in this DC.

The second one is an "end-user accommodation DC." An end-user accommodation DC is a DC that connects with a terminal of an end user that is a destination of service provision, and a plurality of end-user accommodation DCs can correspond to one service anchor DC. A later-described "provider plane" (P-plane) is incorporated in this DC.

The third one is a "relay DC." A relay DC is a DC that is in a single or plural number (this causes the system to be organized in three or more than three layers, respectively) and located on a route between a service anchor DC and an end-user accommodation DC in order to relay a message or data transmitted and received between the two, or to help migration of a later-described software appliance or the like. When many end-user accommodation DCs correspond to one service anchor DC, dividing the end-user accommodation DCs into several groups and placing relay DCs that take charge of or control each group can reduce load concentration on the service anchor DC. A later-described "mirror plane" (M-plane) is incorporated in a relay DC.

When plural services are provided, physically one DC can function as a service anchor DC for one service, and as an end-user accommodation DC for another service (and as a relay DC for still another service). That is, two planes or more of the three types of planes can be incorporated in one DC, and in that DC, an "origin plane" can operate for one service whereas a "provider plane" can operate for another service.

Accordingly, for example, in a case where a plurality of DCs are connected in a tree structure and if the central DC is the DC located at the root of the tree structure; an intermediate DC is a DC located at a branch; and an end DC is a DC located at a leaf, then the central DC can function as a service anchor DC and an intermediate or end DC can function as an end-user accommodation DC for one service; and at the same time an intermediate DC can function as a service anchor DC and an end DC can function as an end-user accommodation DC for another service.

Taking advantage of the tree structure, for example, the central DC may be a DC installed solely at the national level; an intermediate DC may be a DC installed each at the prefectural level; and an end DC may be a DC installed each at the municipal level. There may an example where two or more intermediate DCs are installed between the central DC and each end DC. For a concrete example, intermediate DCs at the district level, such as Tohoku, Kanto, and Hokuriku, may be installed between the central DC and each prefectural-level intermediate DC. Constructing a tree structure among DCs can simplify implementation for each regional block DC that has subordinate-level DCs to provide an original service to the subordinates.

One DC can also function as both a service anchor DC and an end-user accommodation DC for one service. That is, when a DC provides its original service only to end users that it accommodates, an "origin and provider plane" operates to provide, by itself to end users, a service whose providing origin is the DC itself. This DC functions as an end-user accommodation DC or a relay DC (a "provider plane" or a "mirror plane" operates) for another service, whose providing origin is another service anchor DC (a service other than the original service).

In the embodiment, a "plane" is a series of processes executed on a computer to handle a prescribed fundamental process, and is preferably implemented by software produced in such a way as to run on virtual middleware (e.g. VMware Server, VMware ESX Server, or VMware Infrastructure of VMware, Inc., Virtual Server of Microsoft Corporation, Xen of XenSource Inc., and the like).

When a service anchor DC and an end-user accommodation DC connect directly with each other (not via a relay DC), an origin plane and a provider plane form one service plane by communicating with each other and by being synchronized with each other as required.

When a service anchor DC and an end-user accommodation DC connect with each other via one or more relay DCs, an origin plane and a provider plane form one service plane by communicating with each other via one or more mirror planes and by being synchronized with each other as required.

One service plane then provides one service. Even when a combination of a service anchor DC and an end-user accommodation DC is the same, if it provides a plurality of different services, a plurality of different service planes are conveniently formed. A service plane directed from one service anchor DC to one end-user accommodation DC provides a service to one or more end-user terminals to which the end-user accommodation DC connects; and another service plane is conveniently formed that is directed from the same service anchor DC to another end-user accommodation DC that provides the same service to other end-user terminals.

FIG. 1 shows a view overlooking a possible example of an entire configuration of the above-described service provision system according to the embodiment.

Now, in the embodiment, a software appliance (hereinafter referred to as an "SA") is a program that includes at least an application program having a service provision function, and is preferably a program into which the application program and a guest OS of server virtualization technology are integrated.

Then, if virtual middleware is installed in a computer (a DC, in the present system), an identical program can run on the virtual middleware (on a plane, in the present system) no matter what hardware, firmware, or OS (host OS) is adopted by the computer. For example, Virtual Appliance of VMware, Inc. is a virtual machine (program) in which an OS and an application are installed and set up, and can be used as an SA.

Figure 2:
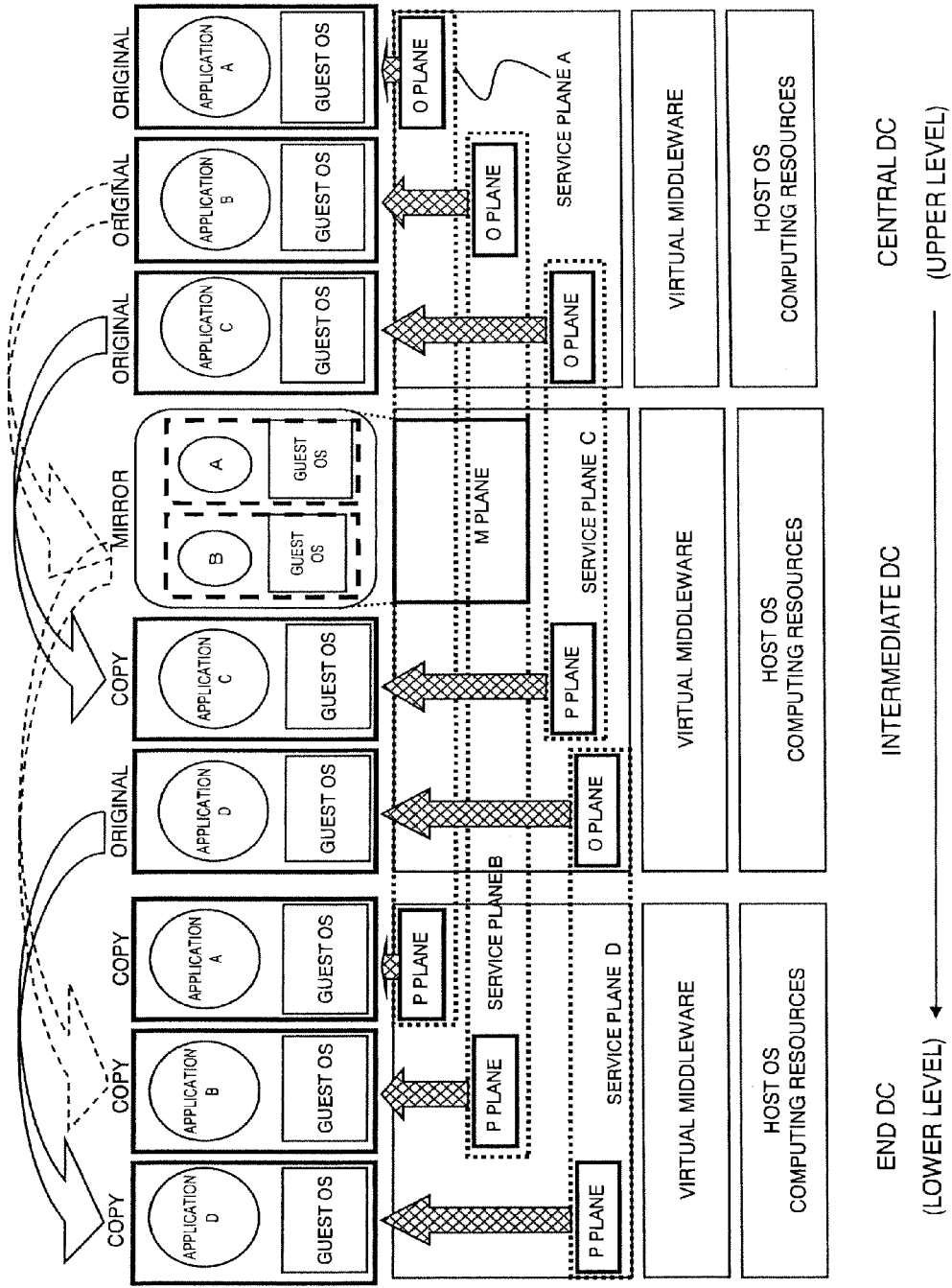
FIG. 2 illustrates functions of the respective components of the service provision system according to the embodiment consistent with the invention.

FIG. 2 illustrates functions of each component of the system in a case where an SA using virtualization technology is adopted in the embodiment.

Each DC is a server in which virtual middleware, which may be referred to "MW" in the figures, is installed on its computing resources and host OS. In each DC, a plane required for a service to be provided (a plane determined according to which of the three types of planes on a delivery route of the service concerned the DC is located in) is made operate on the DC's virtual middleware. The virtual middleware and each plane combine so as to establish a virtual environment of the service provision system of the embodiment.

An SA runs on a plane for a service concerned in a DC where the SA exists, using computing resources of the DC. An SA includes an application program and guest OS to provide a service concerned.

When a later-described migration is performed regarding an SA, an origin plane adds "application delivery condition" information to the SA. "Application delivery condition" information includes: an identifier of the SA; the name of a DC that has a provider plane to provide a service to an end user by holding and running a copy of the SA; the name of a DC having a mirror plane that is on a route through which the copy of the SA moves; and a piece of information indicating a holing period of the copy of the SA in a mirror plane concerned or whether the copy is to be immediately deleted or not. The number of the DC names and the pieces of information depends on the number of mirror planes concerned.

Migration of an SA results in a state where a copy of the SA is running on an end-user accommodation DC (an end DC for services A, B, and D; and an intermediate DC for a service C) while the original SA is running on a service anchor DC (a central DC for the services A, B, and C; and an intermediate DC for the service D).

As for the services A and B, there is a relay DC (the intermediate DC) on a route from their service anchor DC to their end-user accommodation DC, the migration of their SAs is relayed by the relay DC, and therefore mirroring data of the SAs (copies of the SAs, to be deleted afterwards) will exist for a prescribed period. The prescribed period is specified in the above-mentioned "application delivery condition" information, and if immediate deletion is specified, the relay DC deletes the mirroring data after creating copies of the SAs inside the end-user accommodation DC or inside a relay DC that is at a lower level than the relay DC.

A mirror plane does not have to exist for every service, and may relay migration equally for any service. Mirroring data uses resources of a relay DC only temporarily, so resources managed by a mirror plane are commonly used for migrations of a plurality of services.

There may be two types of application program that is included in an SA: later-synchronization type and any-time updating type. When a later-described program migration function is executed, an SA of the later-synchronization type permits a certain amount of temporal "difference" between the running of an original in a service anchor DC and the running of a copy in an end-user accommodation DC. In contrast, in an SA of the any-time updating type, the move is made in synchronization so as to hardly cause a temporal "difference" between the two.

In the embodiment, a service envisions various business forms and technological specifications as described above. It may be therefore practical to choose and switch between the later-synchronization type and the any-time updating type depending on the characteristics of an application program that makes up each service.

For example, an application program used for individual office work, such as writing and drawing, or the like, would not change much with time, and may therefore be applied with the later synchronization.

On the other hand, in applications like a game whose circumstances change with time (e.g. a game in which a character is brought up or the like is used by individuals but changes with time) and in applications like video delivery with a questionnaire added with a commercial that changes with time, the application desirably proceeds simultaneously and identically in a service anchor DC and an end-user accommodation DC. When a service is to be provided by these application programs, the present system can carry out migration that is suitable for the any-time updating.

Consequently, in a service such as an online fighting game that is realized by access to a server, while server software for the service is running on a service anchor DC, the identical server software dynamically moves on a service plane to an end-user accommodation DC and continues to run on the service anchor DC and end-user accommodation DC, keeping identical conditions. Thus, while an original of a service is present and running on a far service anchor DC, each end-user terminal can be provided with the identical service including its dynamic conditions by a near end-user accommodation DC.

Figure 3:
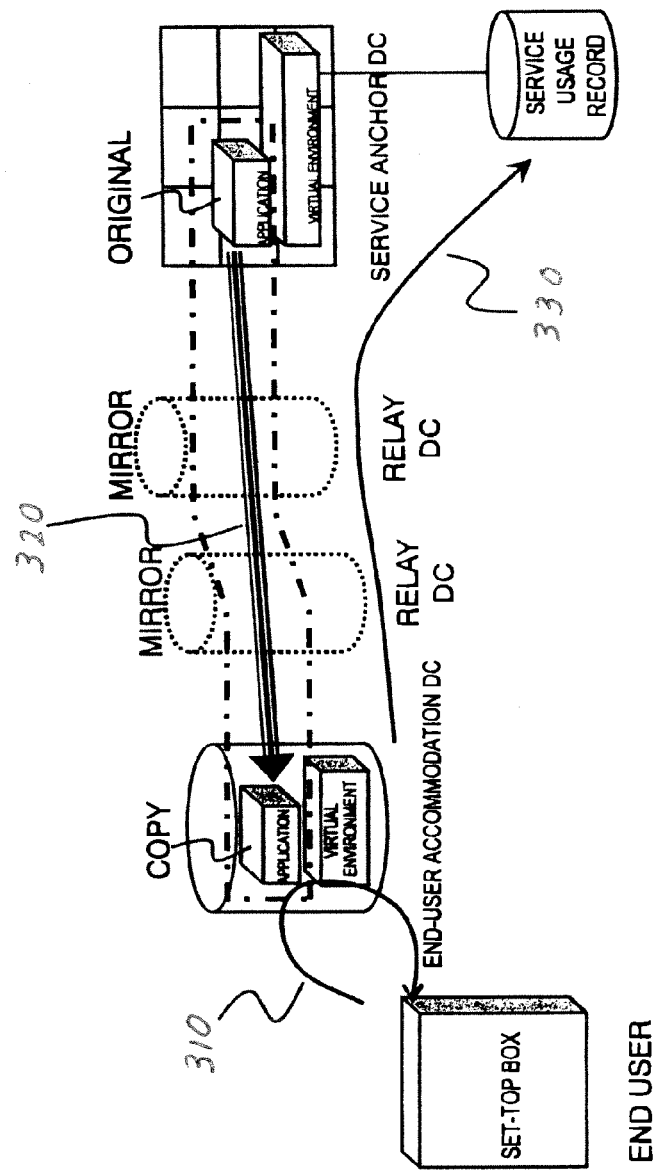
FIG. 3 explains an outline of an operation of the service provision system according to the embodiment consistent with the invention.

FIG. 3 illustrates an outline of an operation of the service provision system according to the embodiment, in which the above-described SA migration is performed. As seen by data path 310 in FIG. 3, the end user actually accesses an end-user accommodation DC that is near the end user. As seen by data path 320 in FIG. 3, an application that provides a service extends, by migration, from a DC that is an original providing origin (service anchor DC) to a DC to which an end user connects (end-user accommodation DC). As seen by data path 330 in FIG. 3, service usage information for an end user is returned to and recorded in a service anchor DC.

In order to get provision of a service, a terminal of an end user actually accesses a near end-user accommodation DC. A terminal of an end user has a computing function, a display function, a controller function, and the like, to get provision of a service, and there may be a set-top box between those functions and a network that connects to the end-user accommodation DC.

A terminal of an end user can see only a user interface when viewing upstream. It is convenient if a terminal of an end user cannot see whether an entity that provides a service is an end-user accommodation DC or not, whether it is a service anchor DC or not, what relay DCs there are between them, or the like.

When a provider of an application and data associated with a service exists besides a service anchor DC, it is convenient if this provider can see only a service provider interface with the service anchor DC and cannot see what route the service is delivered through to be provided to a terminal of an end user.

The service provision system according to the embodiment can form in this way a platform between a user interface and a service provider interface.

In this platform, for every service, an SA of the service concerned is migrated (with mirrors and copies thereof being created) on a service plane formed from an origin plane, mirror plane, and provider plane being connected to each other, and thus an application program extends from a service anchor DC that is a service providing origin to an end-user accommodation DC. Data to be used by an application program may extend similarly, or may be delivered in another scheme.

This extension of an application is controlled by a service anchor DC, and the control relation in which the upper level permits the lower level is maintained by the hierarchical relation between the three types of planes that form a service plane.

In the present system, while a service plane is formed for each service and the three types of planes exist also for each service, a program code of each plane (an entity performing an operation of each plane) can be used in common regardless of the difference between services to be provided by SAs running on planes, and it may be sufficient if information on a delivery route and resources that is to be referred to by each plane is varied from service to service.

Another feature of the service provision system according to the embodiment lies in that a DC in the middle of a delivery route also can become a service providing origin by using existing resources. FIG. 3 shows two relay DCs, any DC of which can each become a new service anchor DC by introducing an origin plane for the DC's original service other than a service currently being provided, while also being able to continue to be a relay DC for the existing service.

This is because commonality of base part of each DC of the system is achieved in a manner where virtual middleware is installed on hardware and a host OS, and any DC can introduce a function as a service providing origin by forming a plane (preparing logical occupancy space for running an SA) on the virtual middleware.

In addition, an existing mirror plane and an origin plane for a new service operate on the same virtual middleware in an identical DC, and thus can cooperate to make up for each other's deficiency in resources.

Still another feature of the service provision system according to the embodiment is that, with a place to manage user profiles being a service anchor DC, service usage information for each end user can be returned to a service providing origin to be managed collectively in one place.

If service usage information is recorded in a terminal of each end user, a place to manage a profile differs depending on which terminal the service was used on, and this makes the uniform management difficult. If, as in the present system, usage information for each end user is to be fed back to an identical place determined depending on which service was used, i.e. a service anchor DC that is the providing origin of the service, service provision can be achieved without constraints of terminals. In addition, a service providing origin (a service anchor DC) and a service providing source (a service provider) can easily obtain usage information for all end users regardless of delivery routes.

With use of the above-summarized service provision system according to the embodiment, for example, business models that have existed separately (e.g. the regions and the center, a content holder and a delivery operator, and the like) can be coupled to create a new service delivery business model; each operator can do both its own business and a bigger business that embraces the operator itself in a well-balanced manner through control of services provided by the respective operators; and/or a global multi-field service that crisscrosses carriers, terminals, and DCs can be realized.

Figure 4:
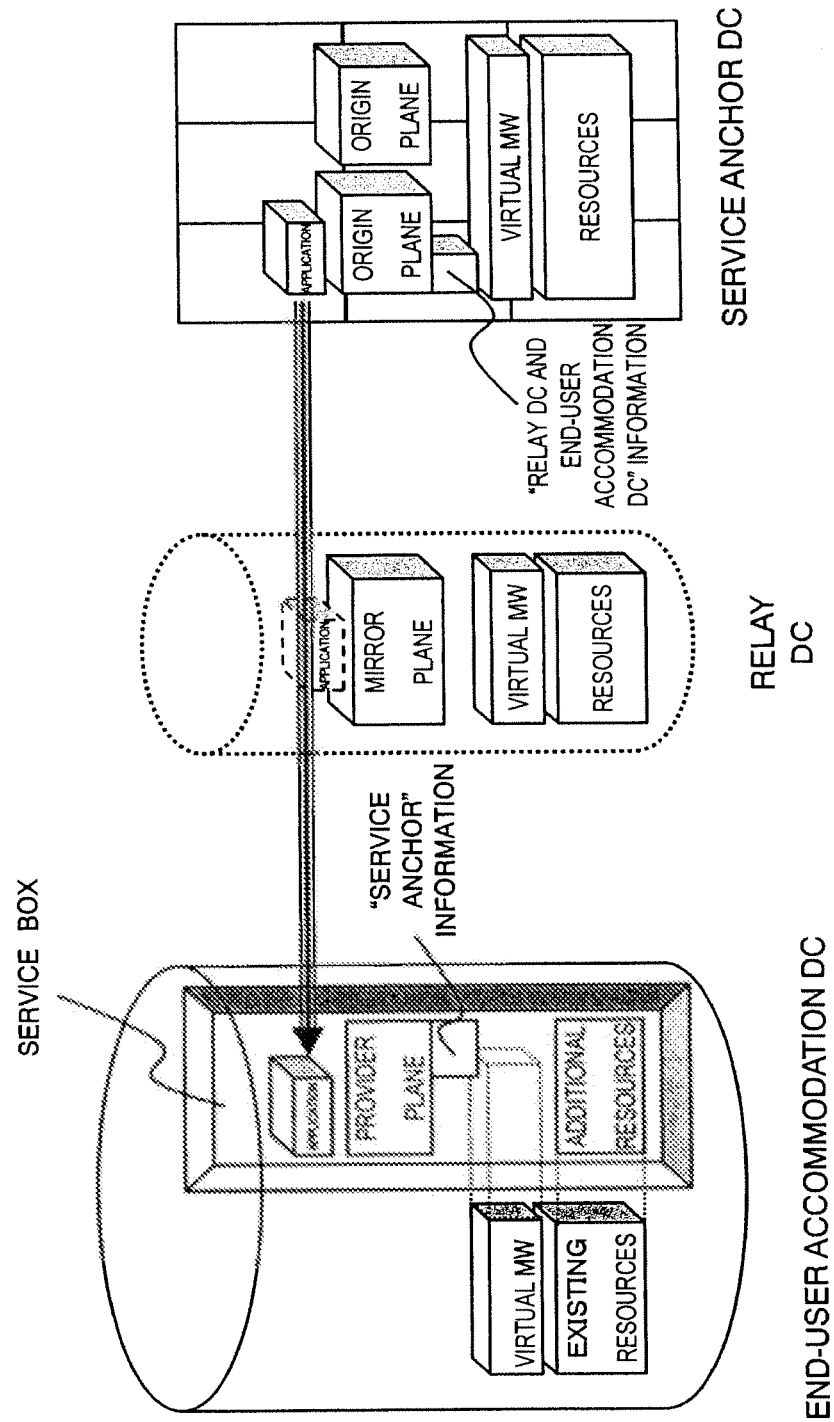
FIG. 4 illustrates an example of internal configurations of the respective data centers (DCs) that form the service provision system according to the embodiment consistent with the invention.

FIG. 4 shows an example of an internal configuration of each DC that forms the service provision system according to the embodiment.

A "service box" installed in an end-user accommodation DC in FIG. 4 will be described first. Upon receiving a request from a providing source of a service, an operator of a service anchor DC prepares an SA of the service (application) in the service anchor DC with an origin plane, and at the same time prepares a "service box" that is to be installed in a DC to become an end-user accommodation DC for the service.

A "service box" may, for example, be prepared as a one-box server including hardware, or be prepared only with software without hardware. In a case where a "service box" includes hardware, the "service box" may be prepared as a unit that each forms part of a server and becomes capable of operating when mounted on the server, as in the case of a server blade that is mounted in a blade server enclosure, the unit having a CPU, a memory, a hard disk, a line, or other resources.

In a case where a "service box" is prepared only with software, it is convenient if the "service box" is prepared in the form of a CD, DVD, or the like that includes an auto-boot function by which the software is automatically installed in an environment where hardware of a prescribed specification is prepared. When the software is automatically installed, virtual server space corresponding to the service box will be formed virtually in an existing server (DC).

When an operator of an end-user accommodation DC attempts to provide a new service to end users as the operator's own business, the operator can determine which of many services of a plurality of service anchor DCs is to be provided by the operator itself. If the operator of the end-user accommodation DC determines to provide a certain service by itself, the operator contracts the provision of the service with an operator of the service anchor DC of the service as required; purchases a "service box" that is prepared by the operator of the service anchor DC concerned; and installs the "service box" on the end-user accommodation DC, and this allows a provider plane for the service concerned to operate on the end-user accommodation DC and communicate with the service anchor DC, thereby allowing the end-user accommodation DC to provide the service to end users.

For this purpose, the service box in advance includes information to access the service anchor DC (information including an address or the like of the service anchor DC and, if a relay DC is to be gone through, an address or the like of the relay DC) and software to implement a provider plane. The software may includes, besides an entity of the provider plane, automatic plane-addition configuration software that is used at an early stage of incorporating the provider plane concerned into the end-user accommodation DC.

The information to access the service anchor DC may include information to log in to the service anchor DC and to the origin plane for the service concerned, information to specify where in the service anchor DC to store usage information of the service concerned, or the like.

If an end-user accommodation DC is to be installed with virtual middleware before a service box is installed, provider planes to be prepared for use in a plurality of end-user accommodation DCs can be implemented by common software even if the DCs adopt different OSs (host OSs) or the like.

In order to supplement to the end-user accommodation DC resources that will be additionally required for the provision of the service, the service box may further include hardware whose specification is determined by the operator of the service anchor DC. If the end-user accommodation DC is to be installed with virtual middleware before a service box is installed, any hardware included in the service box can be added, in the end-user accommodation DC, to its resources.

Information on a relay DC that is on a route to the service anchor DC and resources that will be additionally required for the provision of the service may differ depending on each end-user accommodation DC. By including items specific to each end-user accommodation DC in a service box which is to be distributed to the end-user accommodation DC as above, an SA that is delivered afterwards from the service anchor DC side can be common to a plurality of end-user accommodation DCs.

If having prepared a virtual middleware environment that meets prescribed resources as being common to all services, an operator of an end-user accommodation DC that decided to start a new service can provide the service to end users only by installing a newly purchased service box on the virtual environment, without having to prepare special hardware or software for the new service by the operator itself.

Moreover, being able to provide any service with an identical virtual environment means that operational efficiency improves in an end-user accommodation DC.

In a case where a service box is provided including hardware and if the service box is created such that the hardware is optimized and automatically incorporated into an environment into which the service box is installed, an operator of an end-user accommodation DC need not have specialized technical knowledge, operational know-how, and the like, on not only software but also hardware for operating the service concerned, so that the burden on the operator can further be reduced.

These features of a service box allows each minor operator that acts as contact for service provision to end users (e.g. an area-limited cable TV operator or Internet operator) to give independence to selection of a set of services that is provided to the operator's users (end users).

Upon getting a commission from a providing source of a service, the operator of the service anchor DC prepares the above-described "service box," while preparing an origin plane and an original of an SA in the service anchor DC. The operator then stores at the origin plane information on an end-user accommodation DC operated by an operator that has purchased the "service box" and on a relay DC that is on a route thereto (information including an address or the like of the end-user accommodation DC and, if a relay DC is to be gone through, an address or the like of the relay DC) as information that can be referred to by the origin plane.

In the present system, the extension of an application associated with each service is controlled in a centralized manner by the service anchor DC of that service, which refers to the above information on an end-user accommodation DC and on a relay DC stored at the origin plane, when controlling the extension. Since the service anchor DC can grasp all end-user accommodation DCs that may appear and routes thereto, it can calculate a period for which mirroring data is to be held in a relay DC on a route or can predict resources required for relay in the migration.

The above-described "application delivery condition" information can be created by the service anchor DC based on the above calculation or prediction. Operators of each relay DC are notified in advance by the operator of the service anchor DC of resources required for relay in the migration of a service concerned, and then supplement resources if they are likely to be insufficient in view of a relation with another service that shares the resources, before the migration of the service actually starts.

An example of the detailed operation of each plane will be described in the following with reference to flowcharts (FIGS. 5 to 9) and illustrative drawings (FIGS. 11 to 18).

One origin plane is set up in the system for each service. A plurality of provider planes can be set up for one origin plane, namely, for each service. A mirror plane can be shared among a plurality of services.

Figure 10:
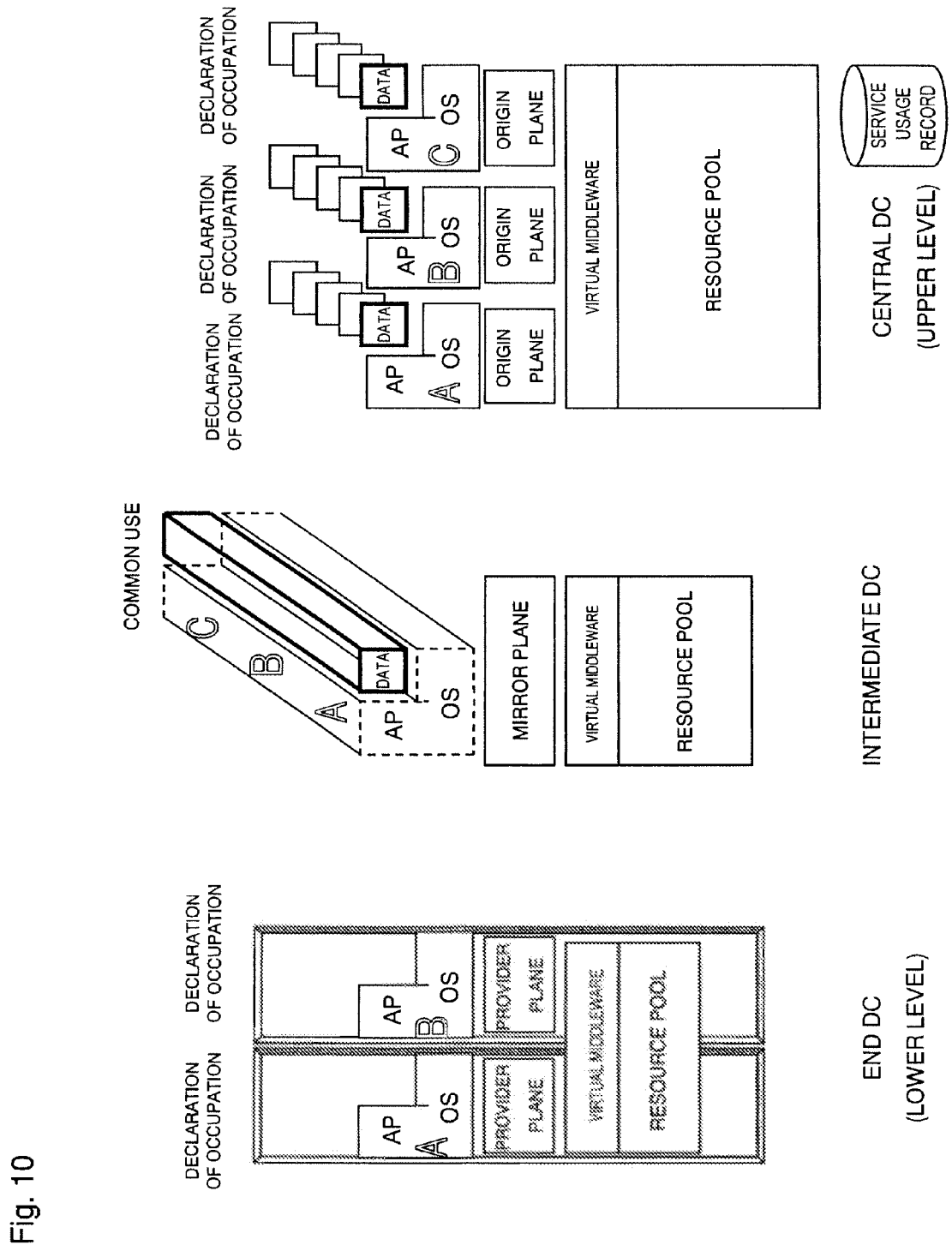
FIG. 10 illustrates an example of use of resources by each plane.

First, use of computing resources by each plane will be described with reference to FIG. 10.

Each service comprises an application program (AP), an OS on which the application runs (guest OS), and data to be used in operation when the service is chosen by an end user (Data).

For example, as shown in the figure, when a central DC is to be a providing origin (a service anchor DC) for a service A, the service anchor DC has an origin plane that is to be a delivery origin of the service to be provided. There is a provider plane on an end DC that connects to end users, and there is a mirror plane on an intermediate DC that relays the application and data. These three planes are joined together for one service to form one service plane as a virtual space.

Applications A, B, and C are moved from the central DC that has originals of the applications, being mirrored by an intermediate DC on a route, to each end DC (the illustrated end DC has chosen the services A and B), and then an end DC to which end users are to connect comes to have a copy of an application.

In the example shown in the figure, an SA into which an application and an OS are integrated is moved in such a way as if it extends over a service plane that is a virtual space for the service. A mirror plane to relay the move relays moves for other services as well. That is, a mirror plane is shared among a plurality of applications to be relayed (A, B, and C in this example), and uses resources of an intermediate DC, sharing them among the plurality of applications.

The right to control the above move is vested in a plane at an upper level than a mirror plane or provider plane on which mirroring data or a copy of an application is created. So, even if a service is provided by an end DC, an origin plane of a service anchor DC that is the providing origin of the service can perform a control of the service, for example, control of menu display to users, input control, billing control, or the like.

As a service providing origin, an origin plane includes as objects of management an original of its own SA; program data as a whole; an end-user profile database in which a service usage record of each end user is stored and accumulated. The origin plane declares exclusive reservation of the resource capacity for the program for each service and the whole data.

A mirror plane possesses an area for mediating from an origin to a provider as a common resource area. This area is for transferring a plurality of SAs and data thereof that the mirror plane is to receive from the origin with a move instruction, and is shared constantly.

If the service A is moving from an origin plane at an upper level to a provider plane at a lower level (in "time t1 for copying from the origin to the mirror plus time t2 for copying or moving from the mirror to the provider"), high priority is given to the service A in the meantime as to the area of the mirror plane being used for the service A, and the area cannot be used for other services.

If copying (i.e. a move with an original remaining in a move origin and with a copy being in a move destination) of the service A from the origin and copying or moving of the service A to a next mirror or provider plane that is under the present mirror plane have been finished, resources having been used for reception and transmission of the service A in the area of the present mirror plane can be allocated to a mirroring process of a service other than A, except for a minimum area if required to hold a copy.

A provider plane calculates "the number of service users" multiplied by "the utilization rate" multiplied by "the volume of content" for a service that runs on the provider plane, and declares exclusive reservation of the resource capacity (the capacity exceeding a certain value) based on the calculation. Whereas FIG. 10 illustrates a state where an end-user accommodation DC has copies of SAs but has not yet received copies of data, the occupation of resources for each service is declared before a corresponding SA is migrated and before corresponding data is migrated. A provider plane can be configured such that it automatically performs this declaration of occupation at the time of installation of a service box, allowing the operation to allocate resources in an end DC to be conveniently performed only by installing or removing a service box at the time of start or discontinuation of a service.

The occupation to be declared here can be as to allocations of a CPU, memory, and hard disk at their maximum use in a virtual environment instead of reservation for a physical area, and if their operating conditions do not actually reach the maximum values, resources can be passed to other services (each plane can distribute resources not only in its own plane but also to other planes).

In the present system, a layered tree structure can be formed in such a way that a delivery base called a service plane is built for each service in a virtual environment where virtual resources can be in shared use, and that one service plane is formed from three types of planes.

Figure 5:
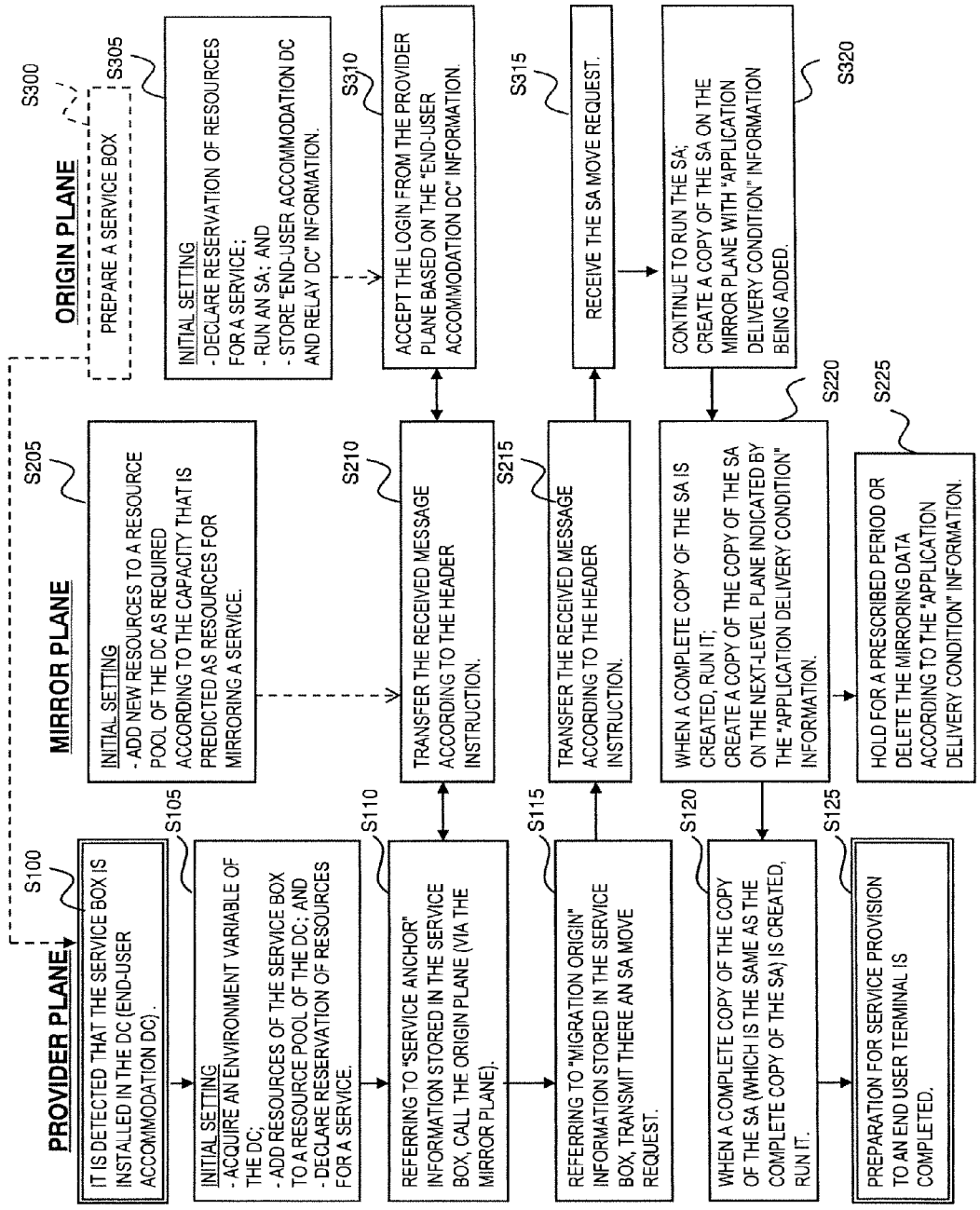
FIG. 5 is a flowchart showing an example of operations of planes of the respective DCs at a time when a service box is installed in an end-user accommodation DC.
Figure 11:
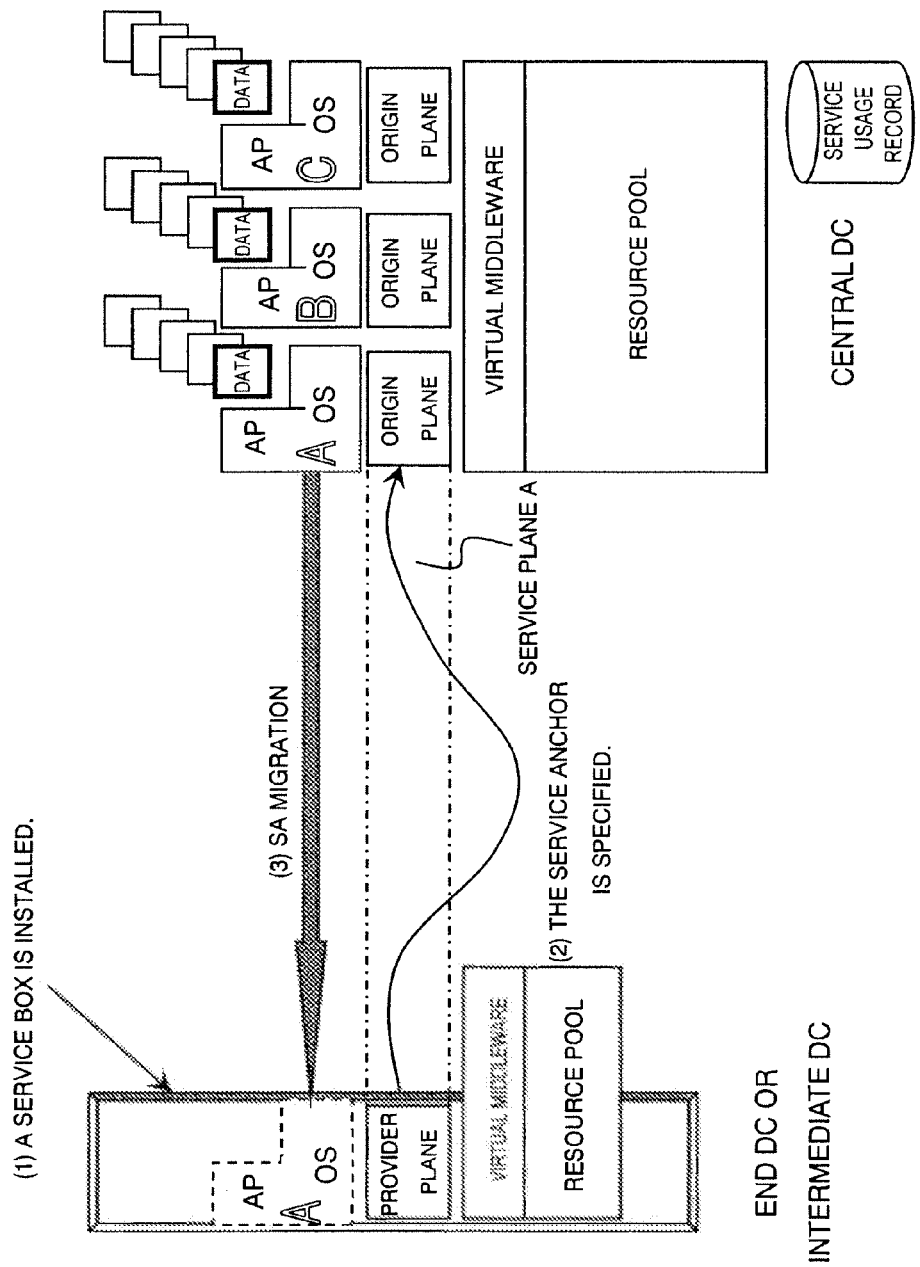
FIG. 11 illustrates an example of operations of each DC at a time when a service box is installed.

FIGS. 5 and 11 illustrate an example of an operation where a service box is installed in a DC which is to be an end-user accommodation DC downstream of one service anchor DC for one service.

The operator of the service anchor DC has in advance prepared a service box and passed it to the operator of the DC that is to be an end-user accommodation DC (S300).

The service box is, for example, an object that exists as hardware resources whose capacity is calculated in consideration of a virtual environment, and in the service box are included: resources required by an SA that is to move into the service box in a later process for providing a service to a certain number of end users; and a provider plane as a virtual environment. Also included are the location of the service anchor DC, and an automatic tool for accessing it.

The capacity of resources to be included in the service box can be calculated by using the number of service users, utilization rate, volume of content, or the like, as a parameter. For example, for a service of moving picture drama delivery added with an in-program questionnaire function where contents, such as (a) a Korean drama and (b) a Japanese drama, are prepared as a menu in the service, resources (e.g., CPU performance, memory capacity, HDD capacity, line bandwidth) that meet a certain standard (e.g., response time) under specified conditions (e.g., a day of the week or time when the service is likely to be most frequently accessed) are calculated by using: the number of people who will simultaneously use the service; the utilization rate of the questionnaire function that is a two-way function; the volume of each piece of contents that will be provided as the menu; or the like, as a parameter in a formula of the calculation, and are included into the service box.

When the service box is installed in the DC that is to be an end-user accommodation DC, the provider plane having a function to automatically incorporate itself into the DC declares, at the time of the incorporation, exclusive reservation of resources of a volume exceeding a certain value. The volume of resources, occupancy of which is then declared, and the capacity of resources included in the service box may be the same or may be different from each other.

That is, whereas the service box includes resources of a capacity that is calculated based on the number of users or utilization rate recognized by the service anchor DC, if the end-user accommodation DC can predict for users (end users) more precisely, the provider plane can declare the occupation of resources of a capacity that is determined based on the prediction. If the former is less than the latter, the provider plane will occupy resources of the DC in addition to resources of the service box; and if the former is more than the latter, the provider plane occupies part of the resources of the service box, and the rest will be used in another process performed on the DC.

Whereas the service box is passed to an end-user accommodation DC, an origin plane is performing the following operation as an initial setting (S305).

An origin plane declares, in the service anchor DC in which it is incorporated, reservation of prescribed resources for providing a service that it takes charge of (a service A in FIG. 11), and uses the resources to make an SA for providing the service A resident on the origin plane itself. The origin plane also stores information on the DC(s) that is (are) to be an end-user accommodation DC(s) for the service A (and information on a relay DC(s) if there is one or more between the service anchor DC and the end-user accommodation DC(s)) at the origin plane.

The origin plane then determines a particular place to store usage information, which is returned from the provider plane as a later-described on-termination return or any-time return, for the service A, in a hard disk or the like that can be used by the DC in which the origin plane is incorporated. This storage place may be defined as a physical disk, or may be recognized as a disk volume whose name is different from the name of the physical disk and be defined as a virtual disk that can be at a remote location.

Moreover, a virtual technique for storage can be used. In that case, a mapping table between a virtual disk and a physical disk is generated for the storage place; a disk used by the origin plane is mounted to the SA as a virtual disk; the state is managed; and the disk is thus made to be used also by an SA (copy) that runs on the provider plane.

Thereafter, the origin plane is called by the provider plane of the end-user accommodation DC, and accepts the login (S310). From this point on, to a provider plane accepted as above, a message or the like for automatic updating is transmitted when there is provision of an application upgrade, patch, or the like, or a new-arrival notification message or the like is transmitted when new data is registered.

Whereas the origin plane performs the initial setting as above, the provider plane, in the end-user accommodation DC installed with the service box, detects that the service box in which the provider plane is installed is installed in the DC (S100), and performs an initial setting as below (S105).

The provider plane acquires the environment variable(s) of the DC (end-user accommodation DC) in which the service box is installed, and adds resources that the service box contains to a resource pool of the DC. Then, the provider plane declares reservation of prescribed resources, in the resource pool including the service box, for providing a service that it takes charge of. This allows the provider plane to be formed in the DC in which the service box is installed, allowing an operation (including connection to another DC) to be performed using the resources.

After that, the provider plane refers to the "service anchor" information stored in advance in the service box, connects to the DC in which the service anchor exists (when information on a relay DC is also written, via that relay DC), calls the origin plane concerned, and logs in. This allows the provider plane and the origin plane to communicate with each other (via a mirror plane if a relay DC is put therebetween), and one service plane appears. Therefore, for example, the origin plane is notified of errors and alerts that occurred in the provider plane.

At the next stage where a program is migrated, the origin plane receives a migration request for an SA from the provider plane of the end-user accommodation DC (S315). The origin plane may quicken the response to the migration request by starting preparation for migration described below when accepting the login (S310).

In response to the above request, the origin plane migrates (moves) the SA, which has been made resident on the origin plane, onto the provider plane of the end-user accommodation DC (via a mirror plane if there is a relay DC therebetween) (S320). "Application delivery condition" information is added to the SA to be migrated, as information to specify a route of migration and/or how to hold the application on a mirror plane(s) in the middle of the route. The addition of "application delivery condition" information is included in the preparation for the migration.

The process to move the SA between the DCs may be performed statically (cold migration) or dynamically (hot migration).

In cold migration, if the SA on the origin plane is running, the SA is temporarily stopped; the SA is downloaded to the end-user accommodation DC to create a copy of the SA; and the copy of the SA is started on the provider plane.

As for a service for which an identical SA should be run on both the service anchor DC and the end-user accommodation DC, the SA on the origin plane resumes running when the above-mentioned download task is finished on the service anchor DC.

Cold migration will suffice for an SA comprising an application of the later-synchronization type. In such a case, a copy of the SA running on the provider plane will be older in the status than the SA running on the origin plane.

For this reason, in order to eliminate from time to time after migration the difference between the copy of the SA on the end-user accommodation DC and the SA on the service anchor DC, a difference (a patch) for synchronization or upgraded software is simultaneously delivered at a given time interval from the service anchor DC to end-user accommodation DCs that have the provider plane associated with the service concerned, for example.

In hot migration, the SA running on the origin plane is not stopped; if a session for communication is established between the SA and a terminal of an end user, the session is not discontinued; a copy of the SA is created step by step in the end-user accommodation DC; and when a complete copy is created, the right to execute the service provision moves from the SA on the origin plane to the copy of the SA on the provider plane.

As for a service for which an identical SA should be run on both the service anchor DC and the end-user accommodation DC in a parallel manner (such that they will be in the same state almost simultaneously), the SA on the origin plane remains as it is, continues to run, and also continues to retain the control right, after the right to execute the service provision moved to the copy of the SA on the provider plane.

Hot migration is effective for an SA comprising an application of the any-time updating type, and there occurs little difference between the SA that runs on the service anchor DC and the copy of the SA that runs on the end-user accommodation DC.

Then, also after migration, confirmation information for synchronization (e.g. data uniquely indicating the state, which may be a counter of a program or the like) is transmitted from the service anchor DC to the end-user accommodation DC at a sufficiently short interval. When the provider plane receives this confirmation information and if it determines that there is a difference compared to the state management of the copy of the SA, the provider plane notifies the service anchor DC of the amount of difference and thereby makes a transmission request for the program in order to be in the latest state. The service anchor DC transmits the state of the program corresponding to the amount of difference to the end-user accommodation DC from which the request was made.

In a case where the SA is a virtual machine, VMotion of VMware, Inc. or the live migration function of Xen, for example, can be used for dynamic migration.

Also at the time of automatic updating of the SA, an upgrade or patch may be delivered to each end-user accommodation DC by means of the same dynamic migration as the initial delivery of the SA.

An operation of the provider plane at the time when a program is migrated is as follows.

The provider plane first refers to information on a "migration origin" (which may be the service anchor DC or may be a relay DC) stored in advance in the service box, and transmits a request to the migration origin DC (if information on a DC that is on a route thereto is also written, via the DC) for migration of the SA (S115).

Upon receiving as a result static or dynamic migration of the SA, the provider plane uses resources, reservation of which it previously declared, to set up the SA (copy) on the provider plane itself and starts the operation (S120). If the "application delivery condition" information added by the service anchor DC is not deleted by a mirror plane on the route and is received with the SA (copy), the provider plane deletes the accompanying information.

In order to achieve a multi-level move in which an application is running and does not stop, a mirror plane has a function to manage the state of a move, while moving the application between connected planes, one of which is at an upper level (in the service anchor side) of the mirror plane and the other of which is at a lower level (in the end user side) of the mirror plane (S220).

"Application delivery condition" information added to an application that a mirror plane receives from an upper-level plane (initially added by the service anchor DC) includes, for example: (1) an identifier of the application; (2) the name(s) of a DC or DCs each having a mirror plane that is on the route; (3) a piece of information indicating a period for which the application is held (the copy is held as it is) in the mirror plane or whether it is to be erased (the copy of the mirror concerned is to be erased when the copying for the move from the mirror concerned to a next mirror is finished) or not, to the number of mirror planes on the route; (4) the minimum amount of mirror area resources to be occupied when the copy is held; and (5) the name(s) of a DC or DCs each having a provider plane that is to be a last DC to be reached.

A mirror plane performs state management as to a move of an application, and instructs itself and a lower-level plane. A mirror plane confirms that time t1 for which an application is being copied from an upper-level plane is finished, and then immediately starts copying or moving the application to a plane that is under the mirror plane. That is, the mirror plane carries out successive copy processes so that time t2 for which copying or moving to a lower-level plane is performed is started as soon as possible after t1 is finished. For this purpose, a mirror plane desirably has a function, during copying of an application from an upper-level plane to itself, to: receive "application delivery condition" information as an instruction; prepare information on the location of a next lower-level plane; and wait for the copying from the upper-level plane to be finished.

Specifically, when a mirror plane receives a move execution instruction in which the mirror plane itself is designated by an upper-level plane as a plane to which an automatic application move is mirrored, the mirror plane first takes "application delivery condition" information out, and then starts to store the application accompanied by the above "application delivery condition" information in a common area that has been prepared in advance. When the storing is completely finished, the mirror plane, in accordance with the above "application delivery condition" information, designates a next mirror or provider as an automatic application move destination and gives a move execution instruction to both the mirror plane itself and a lower-level move destination plane.

When the copying from the mirror plane to a lower-level move destination is finished and if the above "application delivery condition" information specifies deletion, the copy of the application on the mirror plane is deleted (As a result, only a move is performed). If the above "application delivery condition" information specifies a holding period, the copy of the application stored in the common area of the mirror plane is kept stored as it is until the holding period passes (S225).

As described above, in program migration in the present system, an SA moves from a service anchor DC to an end-user accommodation DC in response to a move instruction from a plane of a DC at an upper level than a DC concerned, and control is performed in the direction from an upper level to a lower level where the service anchor DC is at the top. That is, a service anchor DC, which is a service providing origin, has the right to control a route and timing of a move of a program, and it can exercise the whole control over service provision to a plurality of end-user accommodation DCs.

Consequently, a new program can be delivered, according to the season for example, simultaneously from a service anchor DC to all end-user accommodation DCs having a provider plane associated with a service concerned, and the addition of a service function or the like can be carried out at any time, as an instruction to all provider planes, by one DC where there is an origin plane that is provided with an SA from a service providing source.

In addition, the program migration using an instruction that spreads from one place allows a program of an application of the any-time updating type to be kept up-to-date and be placed in a distributed manner and, for example, can minimize asynchronous characteristics in which results of program operations differ between a program running on a central DC and an identical program running on an end DC.

Figure 6:
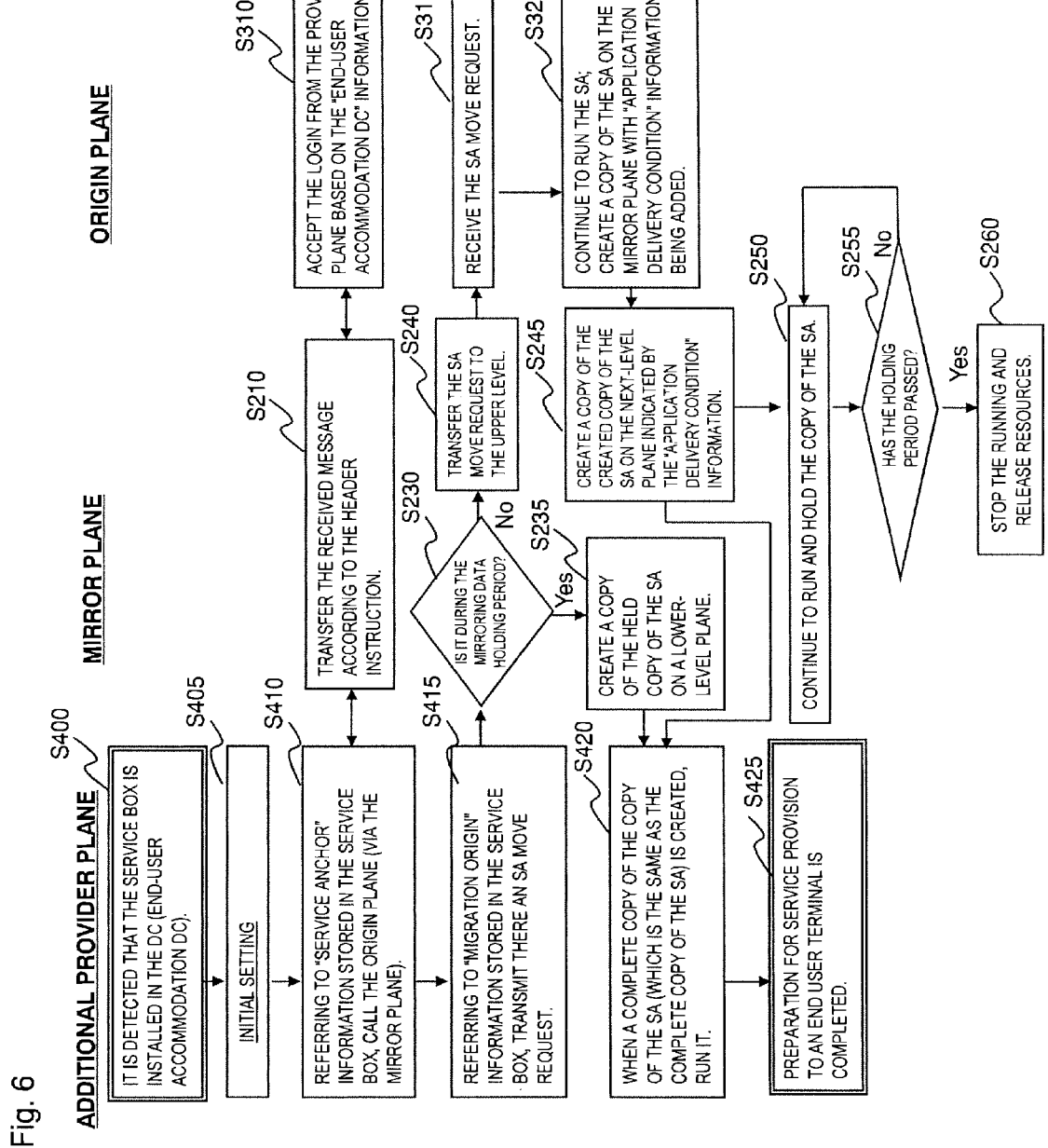
FIG. 6 is a flowchart showing another example of operations of planes of the respective DCs at a time when a service box is installed in an end-user accommodation DC.
Figure 12:
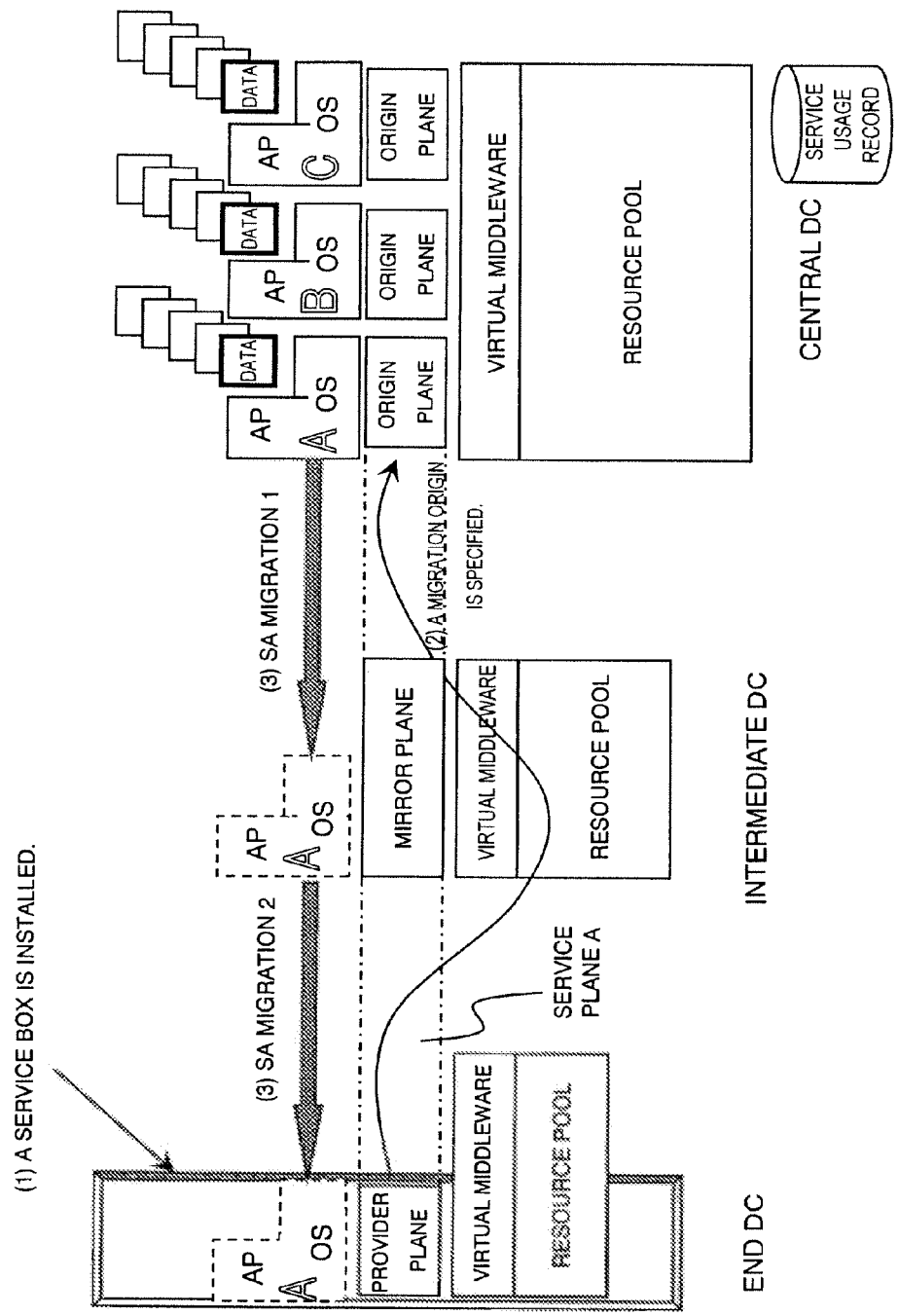
FIG. 12 illustrates another example of operations of each DC at a time when a service box is installed.

FIGS. 6 and 12 illustrate an example of an operation where a service box of a service A is installed in an end DC that is under an intermediate DC where a mirror plane already exists but a provider plane for the service A does not exist (S400).

As in the case of FIGS. 5 and 11, a provider plane is automatically formed by the installation of the service box in the end DC (S405); a login to the origin plane indicated by "service anchor" information is done via the mirror plane (S410); and an SA move request to a plane indicated by "migration origin" information (a central DC that is the service anchor, in this case) is conveyed via the mirror plane (S415).

In the case of FIGS. 6 and 12, since it is known from the beginning that the automatic move of the SA for the service A is performed by using the relay function of the mirror plane, the service box to be installed in the end DC is in advance provided with information on the fact that there is a mirror plane in the middle of a route to the service anchor and on the location (the path) of the mirror plane, in addition to information that the service anchor is the central DC.

In this case, the capacity of resources is determined in advance according to a predictive calculation formula including the size, service audience rating, or the like of the provider plane(s) under the mirror plane, and the determined resource capacity is manually incorporated in the mirror plane prior to the service box being installed in the lower-level DC (S205).

The capacity of resources to be incorporated in the mirror plane can be calculated in advance as with the preliminary capacity calculation of resources in the provider plane, but with a difference in that the mirror plane targets a lower-level DC (an end-user accommodation DC or a relay DC) whereas the provider plane targets end users. The resource capacity is calculated, for example, with the number of DCs to be used for the service, utilization rate, volume of content, or the like, as a parameter.

Suppose here that: when the mirror plane receives the SA move request that is from the provider plane to the service anchor DC, the mirror plane has already performed the task of moving the SA for the identical service toward another provider plane (S240 and S245); and during the task the mirror plane has been instructed by the origin plane to hold mirroring data (a copy of the SA) for a prescribed period.

In the above case, the mirror plane is holding the copy of the SA (being running if the migration is dynamic) (S250), and when the holding period specified by the origin plane has passed (S255), the mirror plane deletes the copy of the SA (S260).

When the mirror plane receives the SA move request that is from the provider plane to the service anchor DC and if it is during the period for which the copy of the SA is held (S230), the mirror plane does not transfer the request to the service anchor DC, but performs the task of moving the copy of the SA from itself to a lower-level plane (S235).

In that case, "application delivery condition" information to be added to the copy of the SA that is to be moved to a lower-level plane may be allowed to be created based on information at a time in the past when the mirror plane received the mirroring data from an upper-level plane; or the service anchor DC may create new "application delivery condition" information as to mirroring data that it created in the relay DC in the past and separately transmit the information to the relay DC.

As another way, the holding period of the mirroring data may be specified, for example, as "until Oct. 10, 2007," and "migration origin" information stored in the service box in advance may be made to indicate the relay DC until the above holding time limit and indicate the service anchor DC after the above holding time limit. In that case, the mirror plane, during the mirroring data holding period, receives an SA move request directing to itself and migrates the SA to a lower-level plane; and, after the period has passed, receives an SA move request directing to the service anchor DC and transfers it to an upper-level plane.

Figure 7:
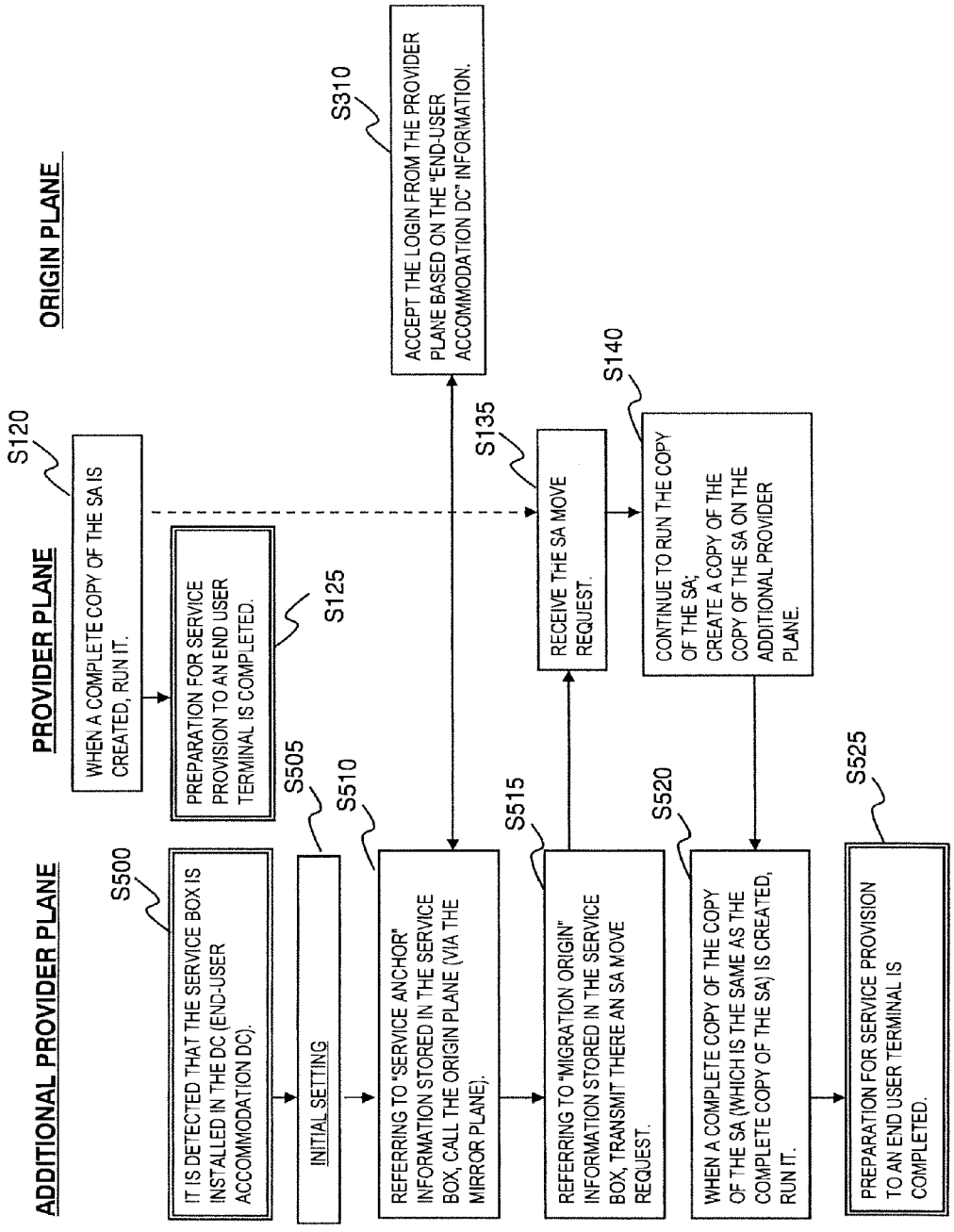
FIG. 7 is a flowchart showing still another example of operations of planes of the respective DCs at a time when a service box is installed in an end-user accommodation DC.
Figure 13:
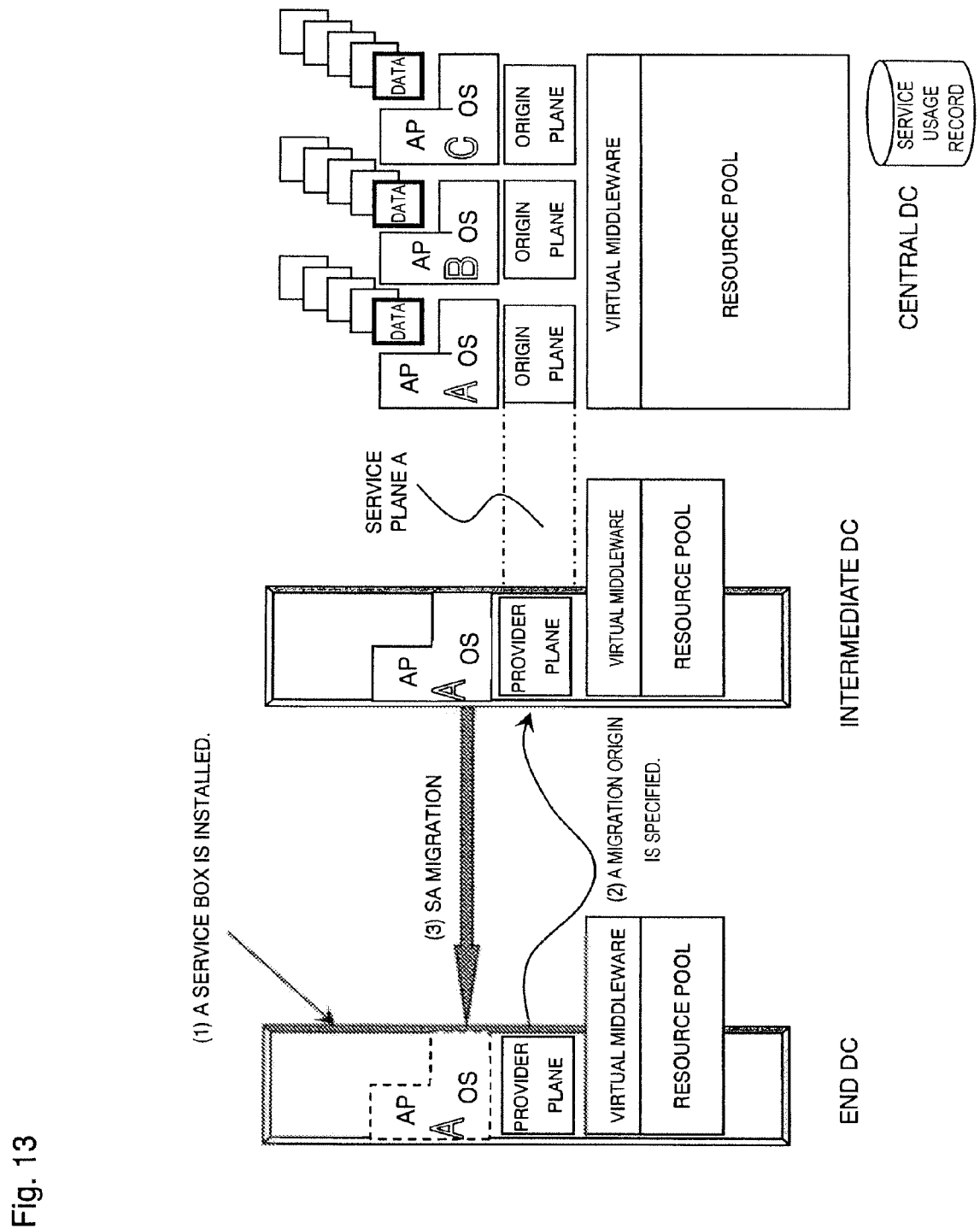
FIG. 13 illustrates still another example of operations of each DC at a time when a service box is installed.
Figure 14:
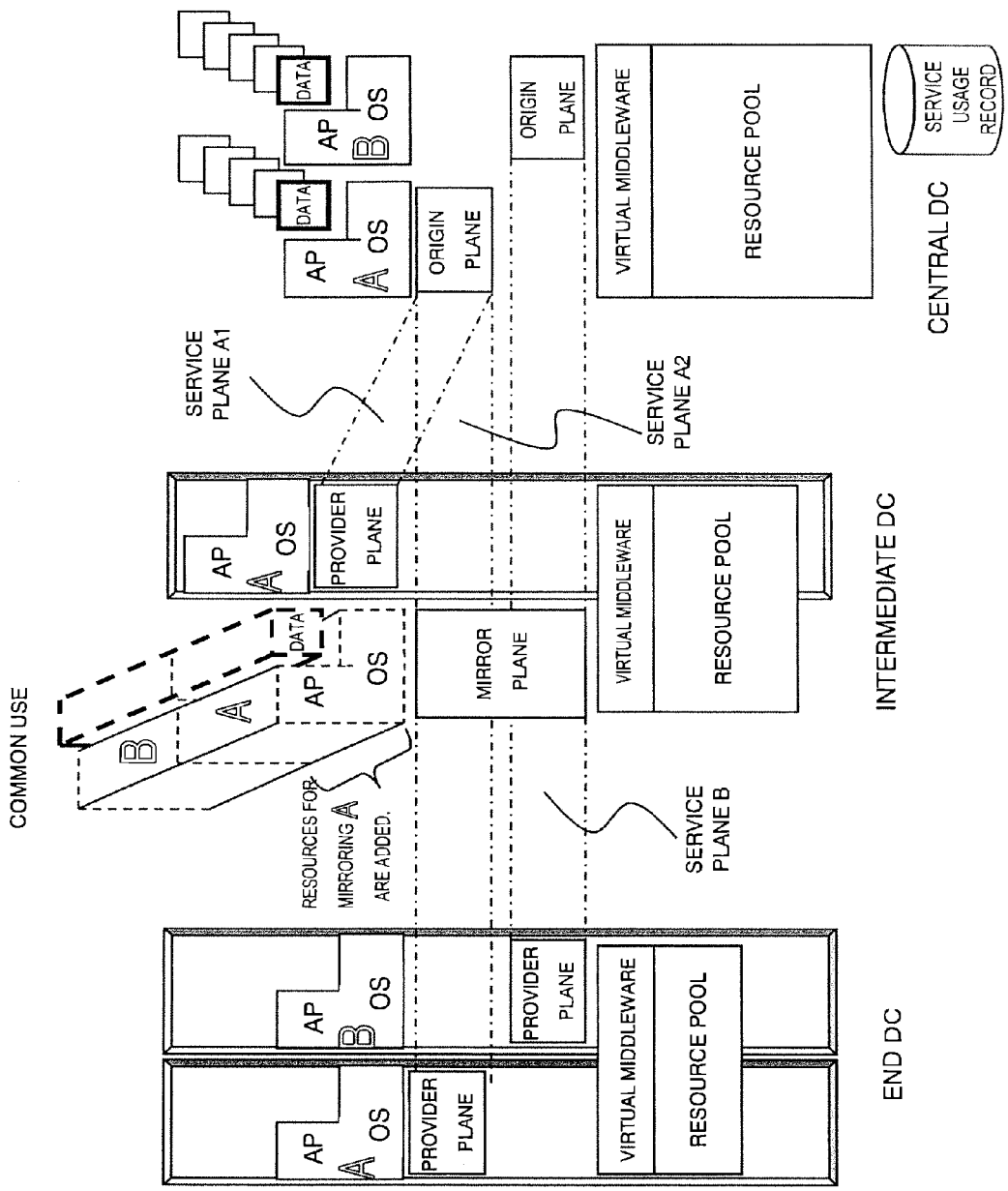
FIG. 14 illustrates the state of the system for the example in FIG. 13.

FIGS. 7, 13, and 14 illustrate an example of an operation where an intermediate DC has a provider plane for a service A and is providing the service to an end user and a service box of the service A is installed in an end DC that is under the intermediate DC (S500).

In this case, the end user that connects to the intermediate DC and an end user that connects to the end DC may be users that are different from each other. Additionally or alternatively, an identical end user may connect to both the intermediate DC and the end DC and be able to receive provision of the identical service A via either route.

As in the case of FIGS. 5 and 11, a provider plane is automatically formed by the installation of the service box in the end DC (S505); a login to the origin plane indicated by "service anchor" information is done via the mirror plane (S510); and an SA move request is sent to a plane indicated by "migration origin" information (S515).

In the case of FIGS. 7 and 13, the DC indicated by the "service anchor" information stored in advance in the service box is different from the DC indicated by the "migration origin" information, and the SA move request is sent to the intermediate DC. Then, the provider plane of the intermediate DC, instead of the origin plane, migrates the program to the provider plane of the end DC.

Specifically, when a "service box" is associated with the same service as the one with which an SA (copy) running on the provider plane of the intermediate DC is associated; the service box is installed in a DC that is closer to end users than the intermediate DC when viewed from the service anchor DC; and thus a new end-user accommodation DC appears, the provider plane of the intermediate DC receives a migration request for the SA from the provider plane of the new end-user accommodation DC (S135).

In response to the above request, the provider plane of the intermediate DC migrates (moves) the SA (copy) running on itself to the new end-user accommodation DC (S140). The migration process is the same as the one that the origin plane performs for the provider plane.

A copy of the SA (copy) is created and set up on the provider plane of the new end-user accommodation DC, so that the service can be provided to end-user terminals that are under the new DC (S520). On the other hand, the SA (copy) running on the provider plane of the intermediate DC continues to run as it is, and the service provision to end-user terminals that are originally under the intermediate DC concerned (and may be different from end-user terminals that are under the new DC) is continued.

As shown in FIG. 14, a mirror plane is also incorporated in the DC in which the provider plane having the above function is incorporated; the provider plane only initially functions as a delivery origin of migration of the SA (FIG. 13); and after that, the mirror plane serves a function to relay from the service anchor DC (FIG. 14).

That is, the provider plane of the new end-user accommodation DC receives information for automatic updating, initial data, the latest data, or the like, not from the present DC that is the migration origin of the program but from the service anchor DC. Therefore, when these items are to be delivered on the service plane, the present DC functions as a relay DC located between the service anchor DC and the new end-user accommodation DC.

For this purpose, the capacity of resources to be prepared in the intermediate DC when the service A is operated in the end DC is determined in advance according to a predictive calculation formula including the size, service audience rating, or the like of the provider plane of the end DC, and resources corresponding to the capacity is manually added in advance, thereby expanding the resource pool of the intermediate DC, before the service box is installed in the end DC.

The expanded resource pool will be a part that the mirror plane uses in common for a plurality of services. For this reason, resources to be added for mirroring the service A can be less than those in a case where resources are prepared exclusively for the service A, and resources for mirroring an existing service B can be used also for the service A.

The purpose of giving a provider plane the function to partly substitute for an origin plane is to reduce load concentration on the service anchor DC as to migration of a program. As described later, load concentration can also be reduced by using a P2P network or other delivery technology for initial data and dynamic data.

By implementing the above-detailed series of autonomous, automated, and distributed delivery functions, the load concentration on the service anchor DC as to application requests can be decreased, and the operational load including preparation of engineers for end and intermediate DCs that desire to provide a service to end users (desire to introduce a provider plane).

In addition, because an application program and data can be placed or delivered at different times and in different manners, the responsiveness of an application may improve; data to end users may be dynamically placed; and network congestion may be equalized.

Figure 8:
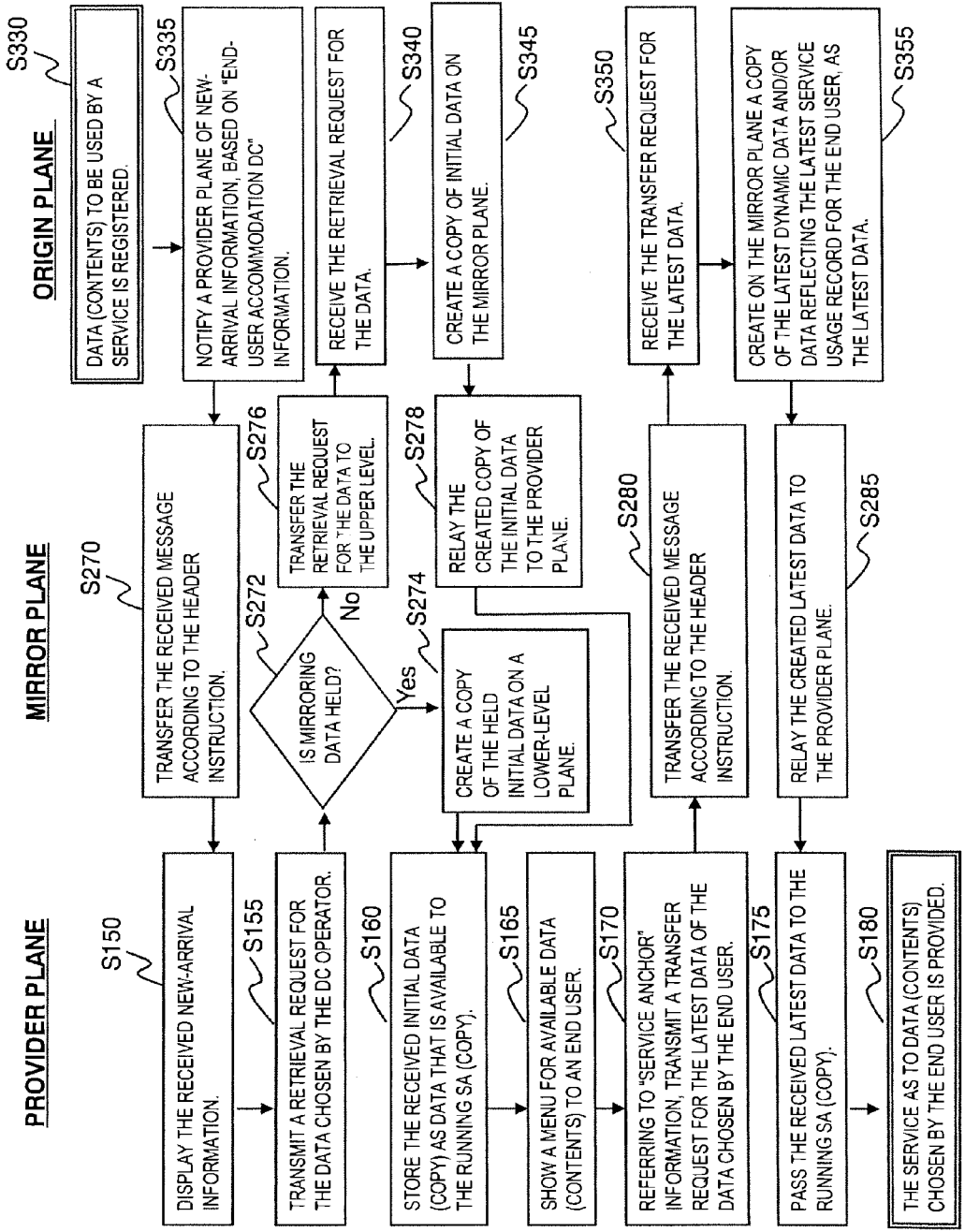
FIG. 8 is a flowchart showing an example of operations of planes of the respective DCs at a time after data to be used in a service is registered on a service anchor DC.
Figure 15:
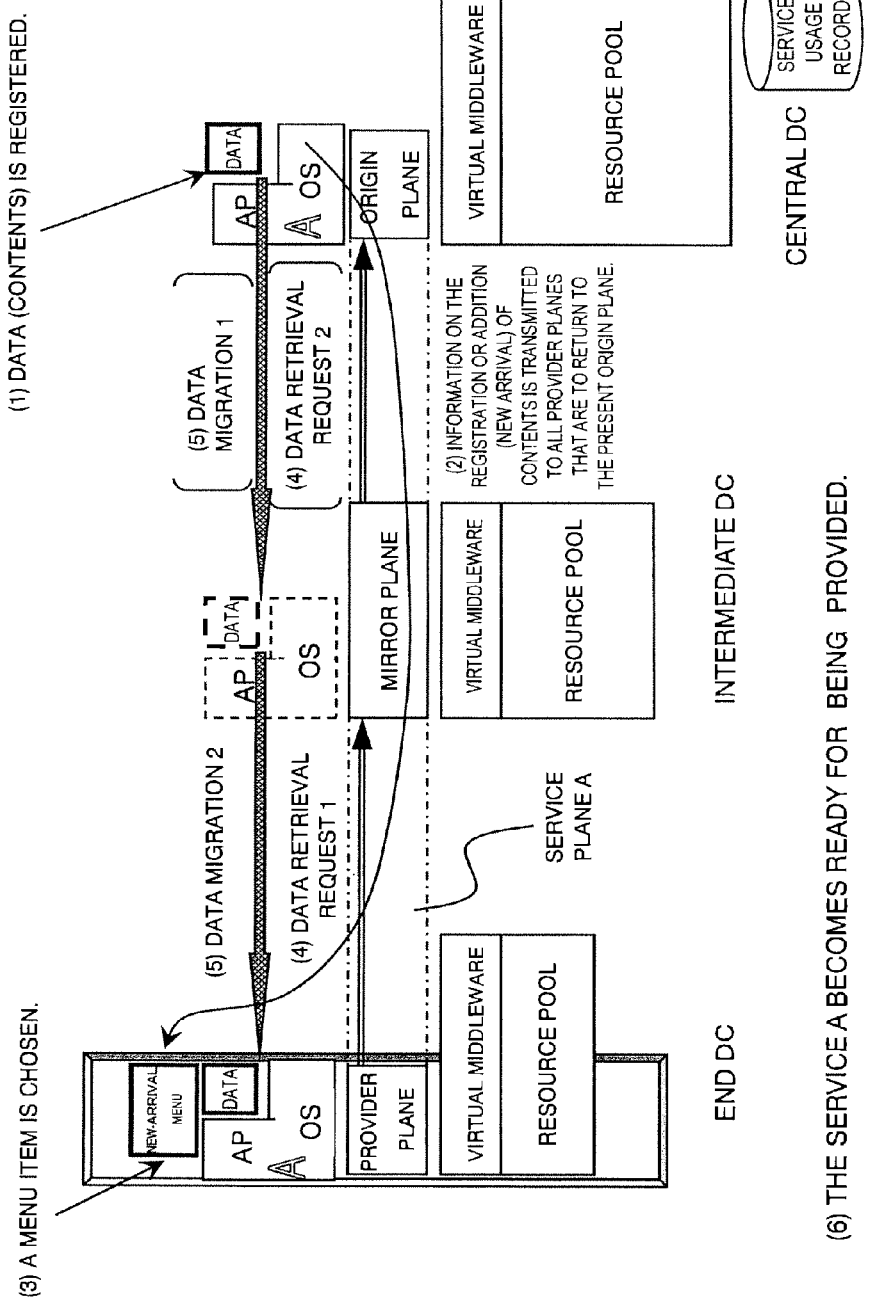
FIG. 15 illustrates an example of operations of each DC at a time when data to be used in a service is registered.

The first half of FIG. 8 and FIG. 15 illustrate an example of an operation to migrate initial data after a program is migrated.

In the present system, one service can provide a plurality of contents (data), and these contents appear in the names of menu items or other forms to users. For example, there is a form where there is a menu item named "Quick Cooking" in a service named "Video Correspondence Course." A description will be made here of operations of each plane after one of such provided menu items is registered as contents (data) in a service anchor.

An origin plane registers with itself contents or other data that is used by an SA running on the origin plane (S330). When contents of a certain service are registered, parameters including the name of a server, the type of the service (e.g. moving picture delivery, an online game, videophone communication, or the like), a service port (e.g. TCP/IP port number), and resources to be used are registered as associated information, in addition to the data of the contents themselves. The above-mentioned associated information is included in the data to be migrated described below.

The origin plane then notifies a provider plane of an end-user accommodation DC whose login has been accepted (via a mirror plane if there is a relay DC therebetween) of information on the registered data (e.g. the title, a brief synopsis, resources to be used, or the like) as new-arrival information (S335).

The provider plane receives the notification of the new-arrival information from the origin plane of the service anchor DC to which the provider plane logged in, and displays the new-arrival information (S150). When the operator of the end-user accommodation DC chooses the newly arrived data as data to be provided to end users in the service, the provider plane reserves resources for transmission and reception of the data, and transmits a retrieval request for the data to the origin plane of the service anchor DC (S155).

In a case where the data is delivered along the service plane, the retrieval request for the data is also desirably transmitted with route information being added so that the retrieval request goes through a mirror plane of a relay DC that is specified in "service anchor" information stored in advance in the service box. In a case where the data is delivered independently of the service plane, transmitting the retrieval request for the data only with identification of a service anchor DC to be the destination may be sufficient.

Upon receiving the retrieval request for the data from the provider plane of the end-user accommodation DC (S340), the origin plane in response to the request, for example, creates a copy of initial data, which does not change with time, in the end-user accommodation DC (S345). This may be carried out by statically downloading the initial data, or by dynamic migration in which a copy of the initial data that is being used by the SA running on the origin plane is created step by step in the end-user accommodation DC.

The provider plane receives the sent copy of the initial data, and makes the initial data (copy) available to the SA (copy) running on the provider plane (S160).

In the present system, when there is a relay DC between an origin plane and a provider plane, an SA including an application program is made to move on a service plane that is virtually formed with a mirror plane. Data, however, may be delivered on or independently of a service plane.

When data is delivered on a service plane, a service anchor DC adds, to data to be delivered, information to specify a delivery route (a relay DC to be gone through and an end-user accommodation DC) and, as required, information instructing as to how the data is to be held in a mirror plane on the route, and transmits the data.

Upon receiving the retrieval request for the data from the provider plane, the mirror plane transfers the retrieval request for the data to the service anchor DC (S276), receives a copy of the data from an upper-level plane, and relays it (S278), if the mirror plane does not hold mirroring data; but if the mirror plane holds it (S272), the mirror plane may pass a copy of the data from itself to a lower-level plane (S274) without transferring the retrieval request for the data to the service anchor DC.

If the volume of the initial data is large, the data is preferably transferred on the service plane by using the function of the mirror plane as in the case of the program delivery. On the other hand, if the volume of the data (which may include later-described dynamic data) is small, the delivery independent of the service plane may be able to reduce more asynchronous characteristics between the service anchor DC and the end-user accommodation DC.

In a case where data is delivered independently of the service plane, the network will autonomously transfer the data if the data is transmitted with identification of an end-user accommodation DC to be the data delivery destination (the data may or may not be transferred via a relay DC that forms the service plane). Thus, the overlay network technology, such as IP multicast and P2P networks, in which an optimum delivery route is formed case by case, can be used in combination, and this allows network congestion to be reduced. When there are many end-user accommodation DCs to be the destination, load concentration on the service anchor DC can be reduced relatively easily if the data is delivered by using, for example, a technique of a streaming-based VoD delivery system of TV Bank Corp. called "gridvod."

Figure 16:
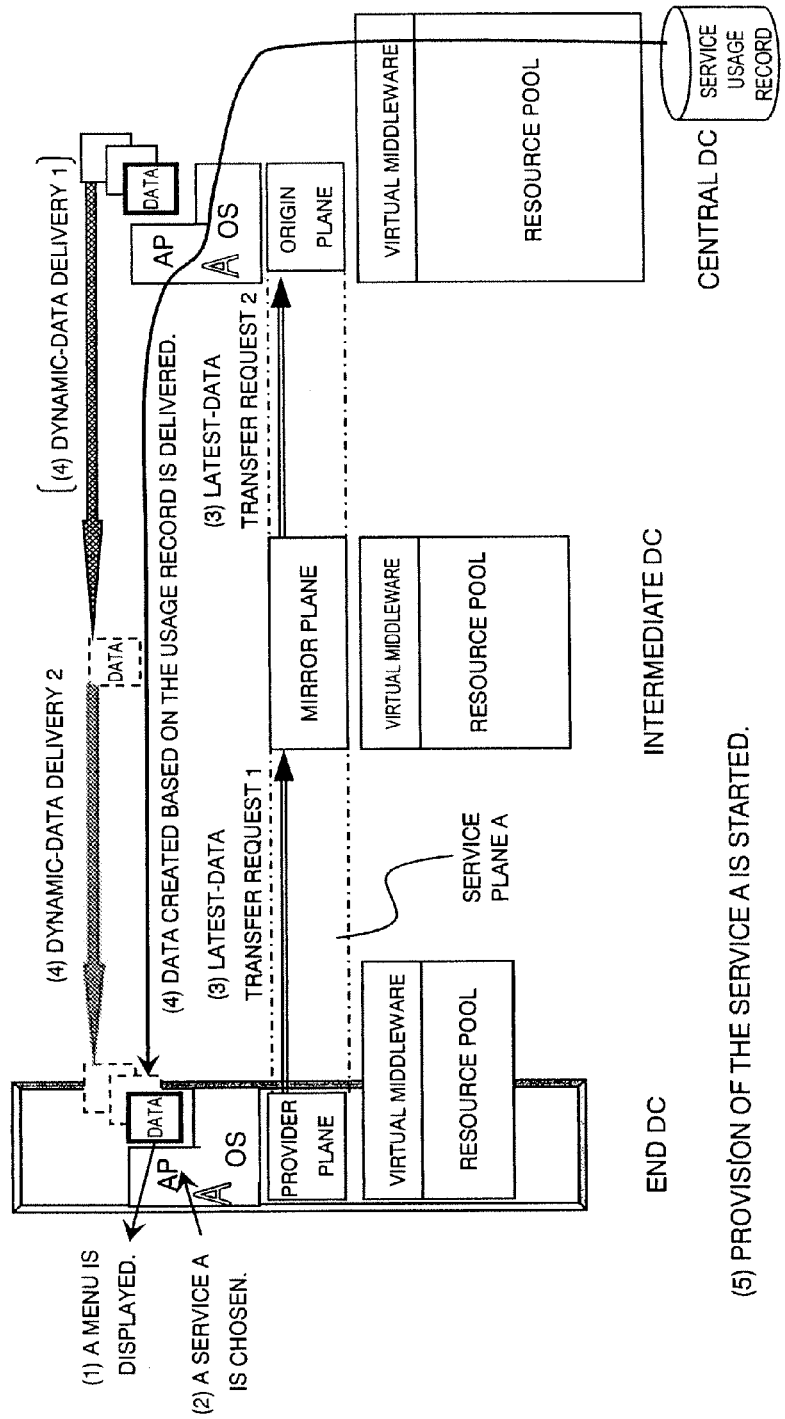
FIG. 16 illustrates an example of operations of each DC until when the provision of a service chosen by an end user is started.

The second half of FIG. 8 and FIG. 16 illustrate an example of an operation to deliver the latest data after a program and initial data are migrated.

The provider plane shows data that can be used by the SA (copy) running on the provider plane, in the form of menu for example, to an end user (S165). When the end user chooses from the menu data whose service the end user wants to be provided with, the provider plane reads initial data of the chosen data (whose copy already exists in the end-user accommodation DC), and at the same time transmits a transfer request for the latest data of the chosen data to an origin plane of a DC indicated by the "service anchor" information stored in advance in the service box (S170).

When the service provision requires past service usage information for the end user, the provider plane includes in the above transfer request information to specify the end user that chose the data, and requests to deliver data based on the latest usage record for the end user or to deliver a confirmation result of the latest usage record.

In a case where the data is delivered along the service plane, the transfer request for the latest data is also desirably transmitted with route information being added so that the transfer request goes through a mirror plane of a relay DC that is specified in the "service anchor" information. In a case where the data is delivered independently of the service plane, transmitting the transfer request for the latest data only with identification of a service anchor DC to be the destination may be sufficient.

As the provider plane of the end-user accommodation DC starts to provide to an end user the service that uses data, the origin plane receives from the provider plane of the end-user accommodation DC the transfer request for the latest data as to data to be used for the service provision (S350).

In response to the above request, the origin plane performs one or both of the following two processes (S355). One is a process in which the origin plane transmits the latest one (copy) of dynamic data (e.g. application status information that changes as the SA runs) to the end-user accommodation DC. Another one is a process in which, if the service provision to an end user requires data such as the condition in which the end user was using the service in the past, the origin plane reads service usage information for each end user, which is recorded in the service anchor DC as described later, to create the required data, and sends the data to the end-user accommodation DC.

The provider plane receives the sent latest dynamic data (copy) and/or data that reflects the service usage record for the end user, and starts service provision for the data by means of the SA (copy) to the end user (S175).

As in the case of the above-described delivery of initial data, the latest data may also be delivered on or independently of the service plane. It may also be delivered by utilizing mirroring data that exists in a DC that is in the middle of the service plane, or by using the above-mentioned overlay network technology.

Figure 17:
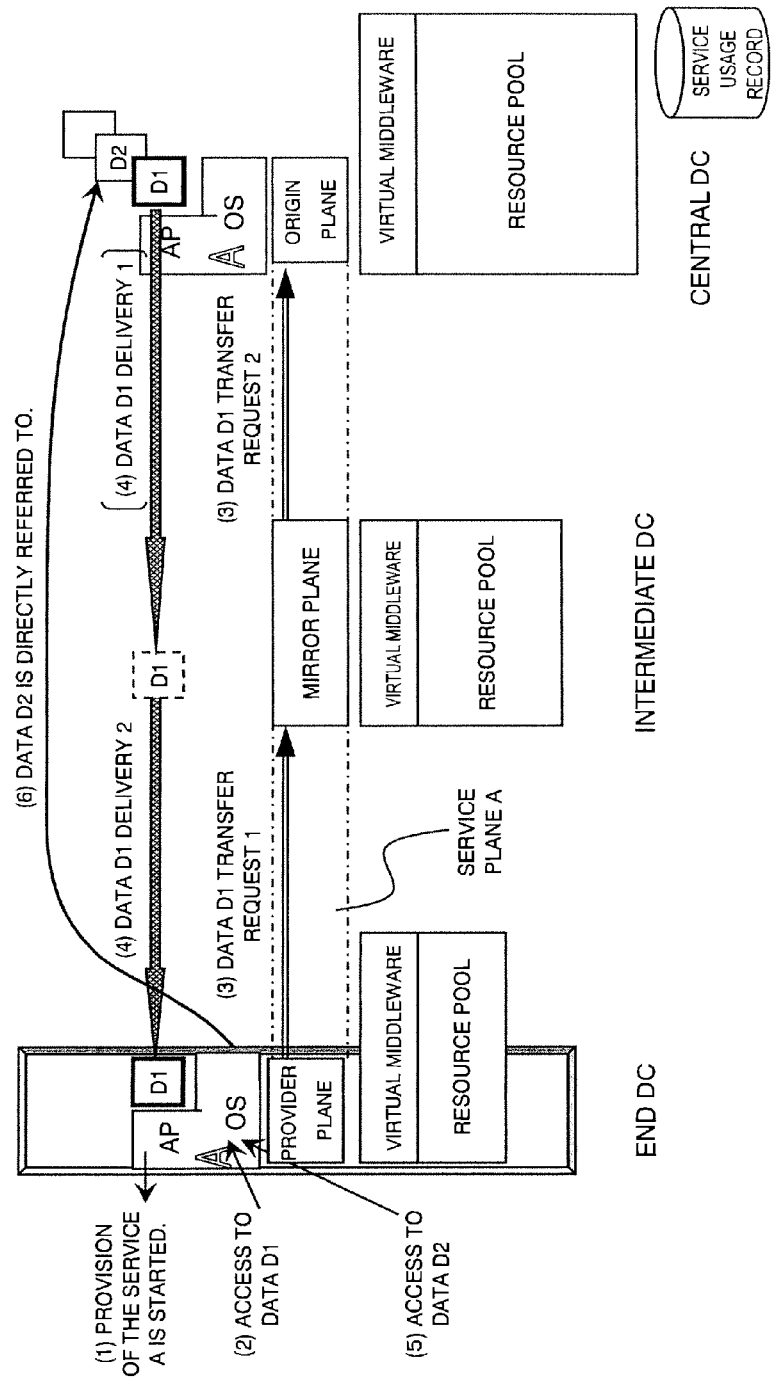
FIG. 17 illustrates an example of operations of each DC during service provision to an end user.

FIG. 17 illustrates an example of an operation to deliver the latest data during provision of a service using data to an end user.

After delivering the above-described latest data to the end-user accommodation DC to start service provision to the end user and before receiving notification that the service provision using the data is finished (during service provision to the end user), the origin plane may continue to send the latest dynamic data (copy) regularly to the end-user accommodation DC, since dynamic data may change during the period.

If the latest dynamic data (copy) is continually sent during service provision to the end user, the provider plane receives the data and makes it available to the SA (copy).

The delivery of the latest dynamic data during service provision may be performed in a push-based manner as described above, or may be performed on demand as with the start of service provision. FIG. 17 shows an example where data D1 is delivered on demand.

It is advantageous to use the P2P overlay network technology for the delivery of data that is dynamically generated and required at the time of using a service, as compared to IP multicast or other delivery methods. Using the P2P overlay network technology does not require special hardware equipment, and can support interactive applications.

If the service anchor, each time service provision using data is started, is initially referred to for the data as described above, the end-user accommodation DC will not be required to do service operation work as to managing data to be delivered. Since data is sent when it is required, the scheme is superior in resource efficiency and can reduce average resources to be retained by the provider plane.

FIG. 17 also shows another data delivery method as data D2. Whether data is to be delivered by the data D1 method or data D2 method is determined according to data attributes. When the dynamic data is data to be managed only by the service anchor DC (without a copy being placed in other DCs), such as data shared online among a plurality of end users, it may be delivered like the data D2.

Specifically, during service provision to the end user, the origin plane accepts an access request from the provider plane of the end-user accommodation DC as to data to be used for the service provision, and allows the provider plane to directly refer to or write data in the service anchor DC. That is, the data D2 is managed such that it has a fixed location in the origin plane and the location is not moved in the virtual environment.

Regarding the data D2, the provider plane accesses the origin plane of the DC indicated by the "service anchor" information stored in advance in the service box, and directly refers to or writes data in the service anchor DC. That is, the provider plane reads data in the service anchor DC via the origin plane and passes it to the SA (copy) running on the provider plane itself; or enters data outputted from the SA (copy) to a storage of the service anchor DC via the origin plane.

Initial data is, for example, a background of an application, a display just after menu activation, contents displayed all the time as a common function, or the like. In an online game such as a roll-playing game, the initial data is, for example, data corresponding to game scenes, to basic data of the characters, and to the choices menu.

Dynamic data is, for example, data to be provided that may change at any time as an application advances or changes, or data to be provided to users as required in accordance with change in the status (the circumstances, a phase, a stage, or the like) of an application. In the example of a roll-playing game, the dynamic data is, for example, data corresponding to a game scene that changed from the starting scene, or subsequent data (e.g., an object broken by a strike) as a result that changes according to a motion of a character (e.g., the strike on the object) or the like.

An application like the case of a roll-playing game requires a usage history, such as up to what point a user advanced the last time, from what scene and in what circumstances the game is to be resumed the next time, or the like. Accordingly, data based on the latest usage record is required to be sent to the provider plane with the first dynamic data that is delivered after initial data.

Figure 9:
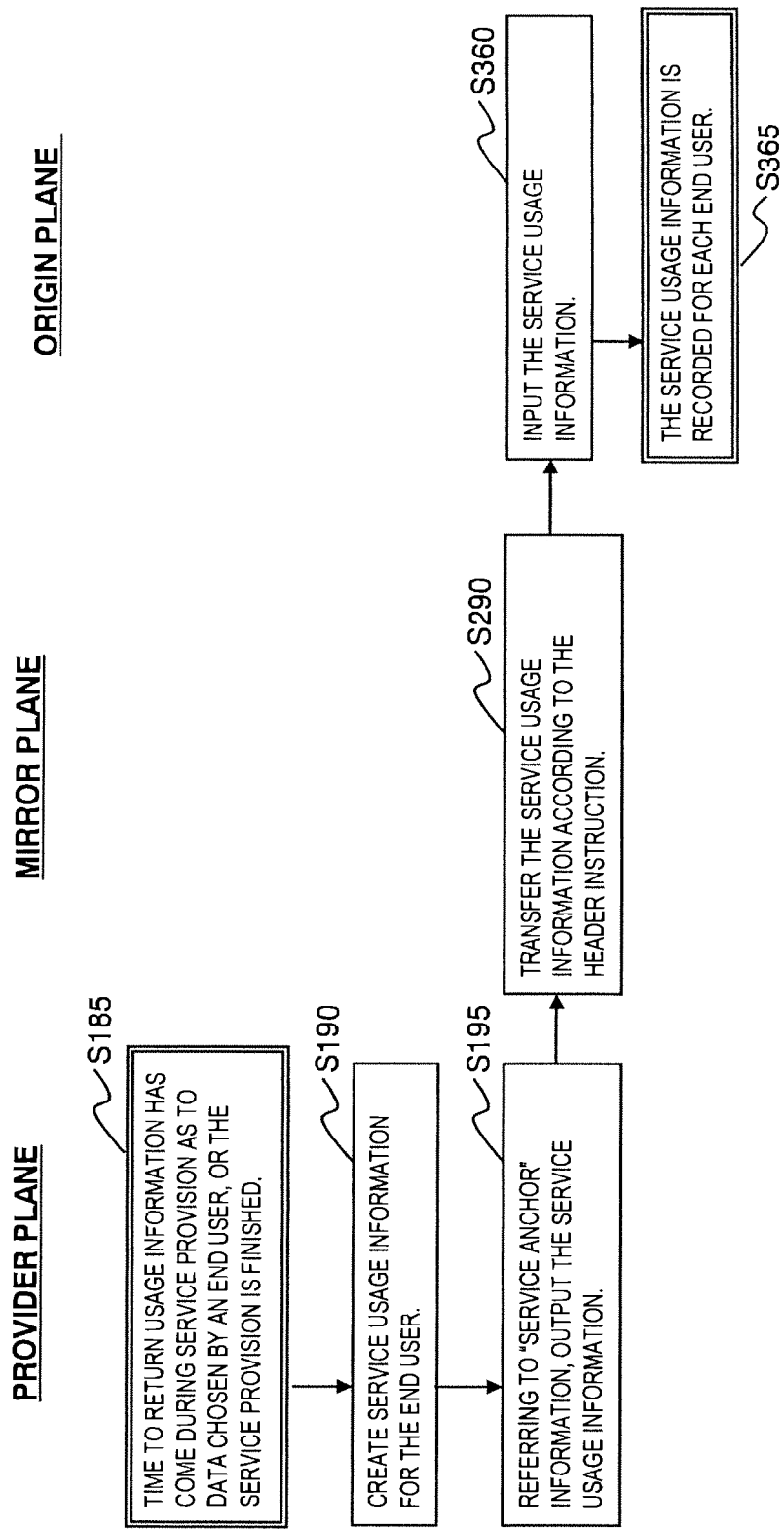
FIG. 9 is a flowchart showing an example of operations of planes of the respective DCs at a time when service usage information for an end user is fed back to a service anchor DC.
Figure 18:
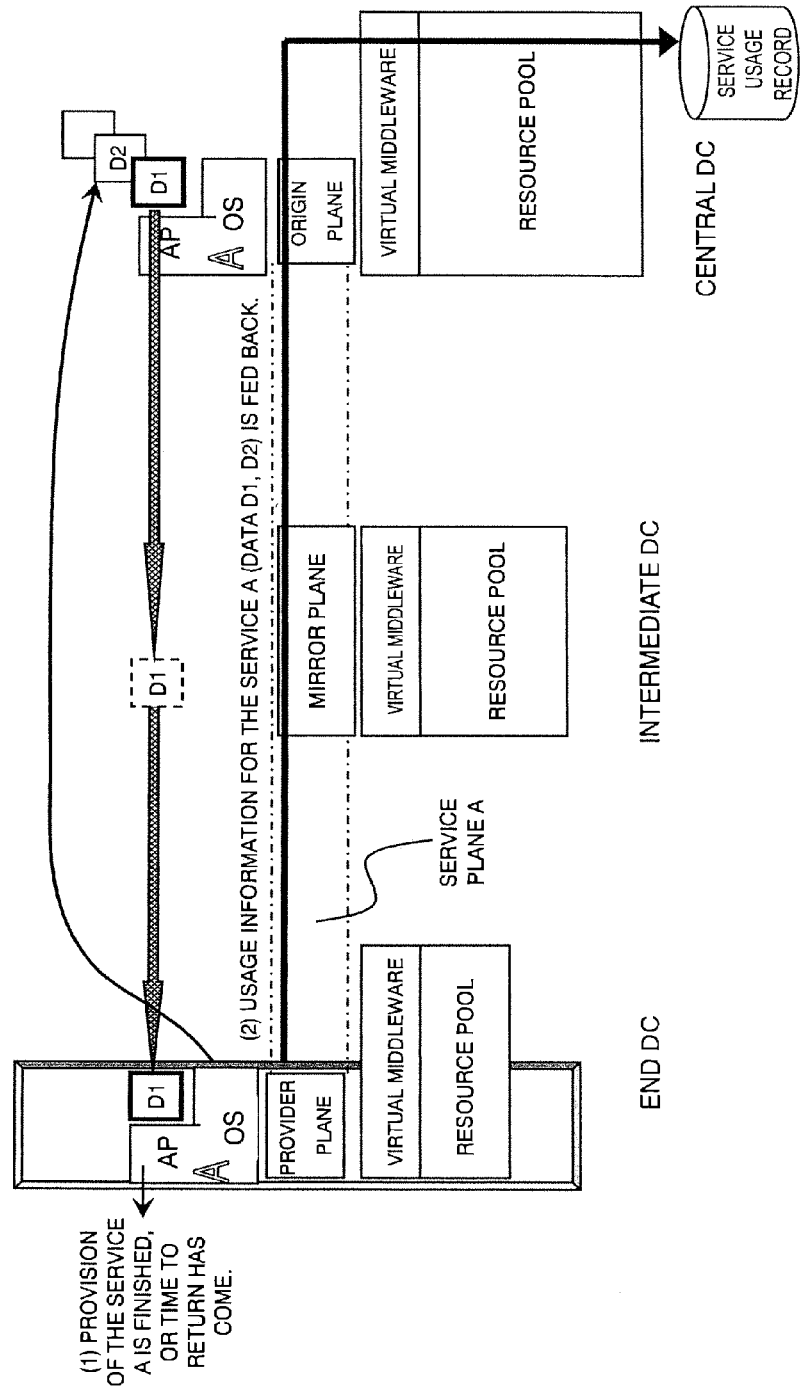
FIG. 18 illustrates an example of operations of each DC at a time when service usage information for an end user is fed back.

FIGS. 9 and 18 illustrate an example of an operation to return service usage information to a providing origin of the service during provision of the service to an end user or after completion of the provision.

Regarding the timing of feeding service usage information back to a service providing origin, there may be applications for which an on-termination return is suitable, or applications for which an any-time return is suitable (S185).

As the feedback method, a transmission-based method may be used in which usage information is transmitted to a return-destination service anchor DC, and the service anchor DC receives this and writes it to a storage defined by the origin plane. Alternatively or additionally, a direct method may be used in which the SA (copy) running on the end-user accommodation DC writes usage information to the above storage in the service anchor DC as if it wrote to its local disk.

In the transmission-based method, usage information may be transferred along the service plane as in the case of the above-described retrieval request for data and transfer request for the latest data, or may be transferred independently of the service plane.

In the direct method, the location and name of a disk in which usage information is to be stored are stored in advance in the service box as part of the "service anchor" information. A network mount point is extended to that location in order that usage information is written via a network to a disk of the service anchor DC specified in the "service anchor" information. That is, physical disk space of the remote service anchor DC is mounted as a virtual disk of the end-user accommodation DC.

The transfer of usage information from the end-user accommodation DC to the service anchor DC may be performed via a route that is independent of the service plane, but is desirably performed on the service plane in a case where, for example, a virtual disk to be used by the origin plane (which is not always a disk in the service anchor DC) is made to be used by the SA (copy) running on the provider plane, by using storage virtualization technology. In this case, the SA (copy) on the provider plane behaves as if it writes to a local disk as to the usage record, but since it is under virtual environment, the pointer is actually directed to hardware resources that is managed by the origin plane, and the usage record seems to be fed back on the service plane for the writing operation.

Either the P2P delivery like the data D1 or the direct reference like the data D2 is performed based on the same "service anchor" information, and therefore the usage record is returned to the service anchor DC regardless of data delivery methods.

Specifically, in an on-termination return, when the SA (copy) running on the provider plane finishes service provision as to data chosen by an end user, the provider plane creates usage information (when and how what data was used) for that end user (S190), and outputs the created usage information to the origin plane of the DC indicated by the "service anchor" information stored in advance in the service box (S195). That is, the usage information is transmitted in the case of the transmission-based method and is written in the case of the direct method, so that the origin plane is made to receive it.

In an any-time return, each time the SA (copy) running on the provider plane reaches a prescribed certain interval or a feedback point prescribed in the application, the provider plane writes usage information (when and how what data was used) for the end user concerned to a storage indicated by the "service anchor" information stored in advance in the service box (which means to output using the direct method).

Since an any-time return is feedback that is performed during the running of the SA (copy) and the content of usage information is likely to have great immediacy or to be time-dependent, the direct method in which writing to a disk is performed may be preferable to the transmission-based method in which a plurality of exchanges are performed. An on-termination return may be one of any-time returns, which is performed upon termination.

As the provider plane of the end-user accommodation DC finishes providing to an end user the service that used data, the origin plane receives from the provider plane of the end-user accommodation DC usage information for that end user as to data that was used for the service provision. In addition, the origin plane may receive usage information at any time during service provision (S360).

The origin plane then records the received usage information for each service concerned and for each end user concerned (S365). Usage information (when and how what data was used) for an identical service can be fed back to and managed by an identical service anchor DC for all end users that connect to various end-user accommodation DCs.

Figure 19:
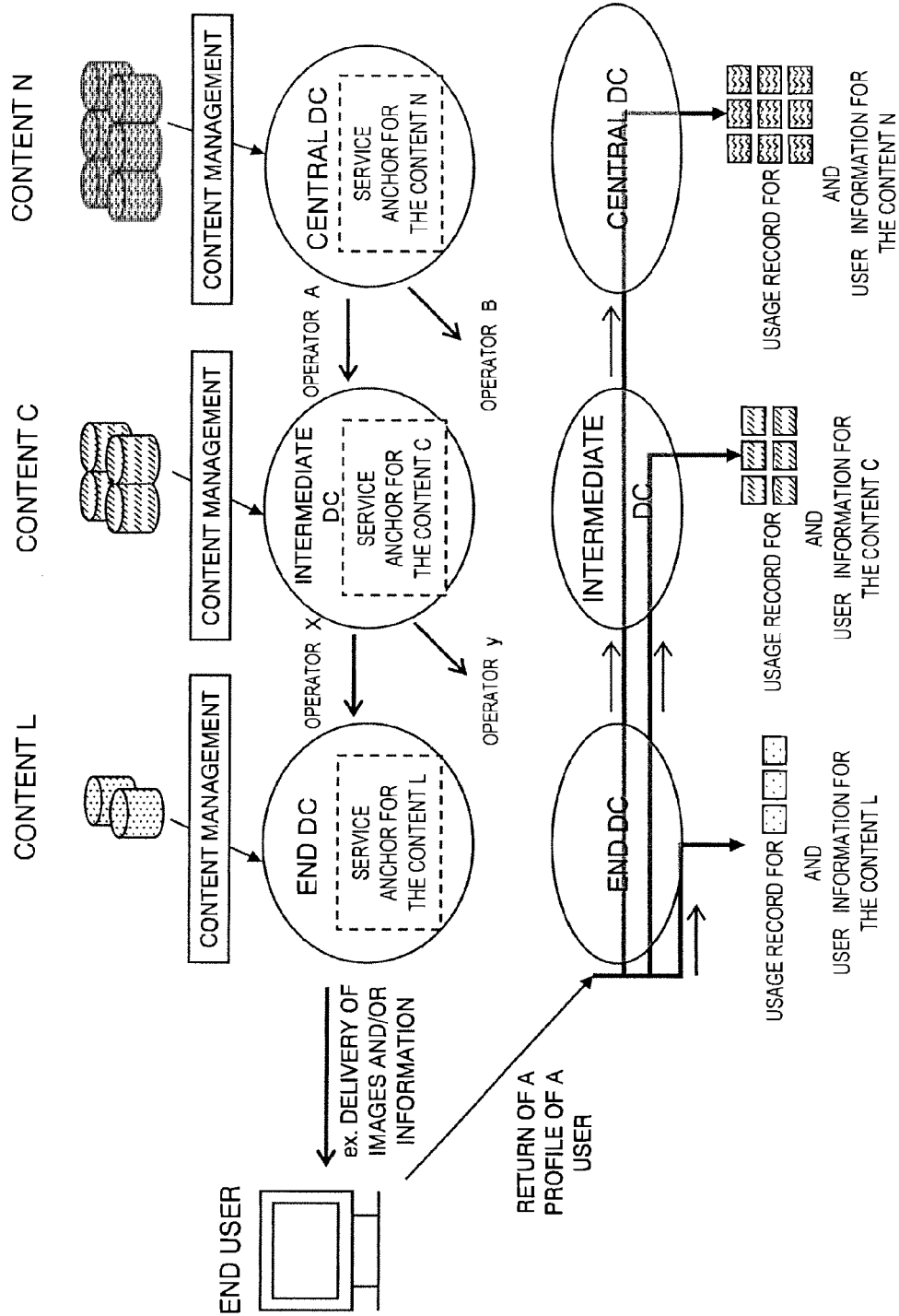
FIG. 19 is an example for explaining how the service usage information is managed in the whole system.

FIG. 19 is a view overlooking how service usage information is to be managed across the present system.

Services are restrictively delivered from an upper-level data delivery operator to a terminal that is under the operator in such a way as to be piled up. However, no user information or record is left in the terminal, and all usage records are returned to a service anchor with user information concerned.

The process of returning a usage record and user information (profile) for an end user to a service anchor of each content is controlled by a provider plane of an end-user accommodation DC, and therefore does not depend on a terminal of an end user, communications equipment, display equipment, or the like that connects to the end-user accommodation DC.

As a result, service usage records for end users are put together to a service providing origin. Consequently, even if provision of services superimposed each other is performed in a layered tree structure, their usage records can be returned to their service providing origins without omission; and use control from upstream can be performed independently for each service while autonomy and independence of an operator to be each service anchor are maintained.

Finally, the functions of a mirror plane will be described collectively. A mirror plane may be steadily used as a common area for an upper-level service.

In order to serve as a bridge between an origin plane and a provider plane, a mirror plane basically functions to execute an instruction issued by an origin plane and to maintain a route between an origin plane and a provider plane according to such instruction. Additionally, in program migration, a mirror plane maintains mirroring data for a prescribed period based on a usage prediction; and in data delivery, a mirror plane may perform P2P hop management as to data D1, or the like.

In a case where a service providing source (which corresponds to a customer of an operator of a service anchor DC) or an operator of a service anchor DC itself knows in advance that many intermediate and end DCs will desire to become end-user accommodation DCs for a certain service and desires to avoid access concentration on the service anchor DC that occurs at the start of the service, mirroring data is held in each relay DC by maintaining resources, which would be allocated to another service if the migration were a move only, as they are for the certain service for a certain period for which program migration, which has a heavy communication load, will be frequently performed (e.g. one week right after the start of the service, or the like), so that the program migration is performed only between a mirror plane and a provider plane. This can solve a problem associated with a popular application that it is difficult to access, requires time, and is not easy to use just after its release.

Specifically, by considering for each service the number of service boxes (provider planes) to be placed in DCs that are under a relay DC, the capacity of data (contents) to be used by the service, the expected utilization rate of the service, and the like, the capacity of resources is determined for a "mirror plane" that is shared among these services; and an operator of the relay DC adds resources having the determined capacity to a resource pool of the relay DC as an initial setting.

Common resources are reserved with priority for a service whose program migration described below is actually about to be performed, and are released such that they can be allocated to another service when an SA associated with the service is completely migrated and mirroring data no longer requires to be held.

As a first relay function, a mirror plane preferably has a function to relay dynamic migration of a program.

In such case, a mirror plane creates step by step on the mirror plane a copy of an SA running on a service anchor DC or on a relay DC (an upper-level DC) that is closer to the service anchor than itself; and when a complete copy is created, the copy of the SA on the mirror plane acquires the execution right.

The created copy of the SA is accompanied by "application delivery condition" information added by the service anchor DC. If the "application delivery condition" information instructs to hold mirroring data, the copy of the SA that acquired the execution right continues to run on the mirror plane for the specified holding period (a period determined based on a usage prediction).

When the complete copy of the SA is created on the mirror plane and the copy acquires the execution right, the mirror plane then creates a copy of the copy of the SA step by step on a plane of an end-user accommodation DC that is under the mirror plane or of a next relay DC that is on a route thereto (a lower-level DC). Which DC is to be the lower-level DC is determined with reference to the above "application delivery condition" information.

The mirror plane makes the copy of the copy of the SA to be accompanied by the "application delivery condition" information as it is, or by the "application delivery condition" information a part of which is deleted, the part not being used in the lower-level DC (the name of the DC of the mirror plane, mirroring data holding period for the mirror plane, or the like).

When the copy of the copy of the SA is completely created on the plane of the lower-level DC and acquires the execution right and if the "application delivery condition" information instructs not to hold mirroring data, the mirror plane deletes the complete copy created on itself.

With the above done, the SA running on the service anchor DC can move via the mirror plane and create its running reproduction in the end-user accommodation DC without stopping.

A mirror plane holds mirroring data (a copy of an SA) for a period specified in "application delivery condition" information. If it receives during the period a migration request for the SA that is from an end-user accommodation DC that is under itself to a service anchor DC, the mirror plane, instead of transferring this request to the service anchor DC, migrates (moves) the copy of the SA running on itself to the end-user accommodation DC that transmitted the request or to a next relay DC that is on a route thereto (a lower-level DC), so that in the move destination DC, a copy of the SA (copy) is created.

On the other hand, the SA (copy) running on the mirror plane itself continues to run as it is, and if the mirror plane again receives a migration request for the SA from another end-user accommodation DC, it creates there a copy of the SA (copy) as well. Using mirroring data as above also contributes to reducing load concentration on the service anchor DC during program migration.

As a second relay function, a mirror plane may have a function to relay various data and messages that are transferred on a service plane (initial and latest data and messages such as a new-arrival notification are transferred from an upper level to a lower level; usage information data and messages such as a request are transferred from a lower level to an upper level), and static migration of a program (S210, S215, S270, S280, S285, S290, and the like).

Since in a service anchor DC an origin plane stores information on each end-user accommodation DC and a relay DC on a route thereto and, in each end-user accommodation DC, information on a service anchor DC and a relay DC on a route thereto are stored in a service box, a header in which a destination DC and a relay DC to be gone through are described in order can be added to data and messages transmitted and received between the service anchor DC and each end-user accommodation DC. A mirror plane need only transmit received data and messages to a next DC specifically in accordance with this header.

As a third relay function, a mirror plane may have a function to relay initial data and dynamic data regardless of service planes, using the P2P network delivery technology (this function is not shown in the flowcharts).

Specifically, upon receiving initial data or dynamic data from a service anchor DC or a relay DC, a mirror plane starts to transmit the data concerned to an end-user accommodation DC that is the destination of the data or to a relay DC that is on a route thereto before the reception is finished. The mirror plane also performs P2P hop management or the like as to each data to be delivered.

While each DC in the present system is placed in a tree structure, each DC may have an Internet connection (a connection with the Internet or a network adopting other inter-networking technology) besides this tree structure connection. In that case, various data and messages transmitted and received between a service anchor DC and an end-user accommodation DC may be transferred via the Internet or the network of other type, instead of via a relay DC. The P2P overlay technology may be adopted in the Internet or the network of other type concerned.

Figure 20:
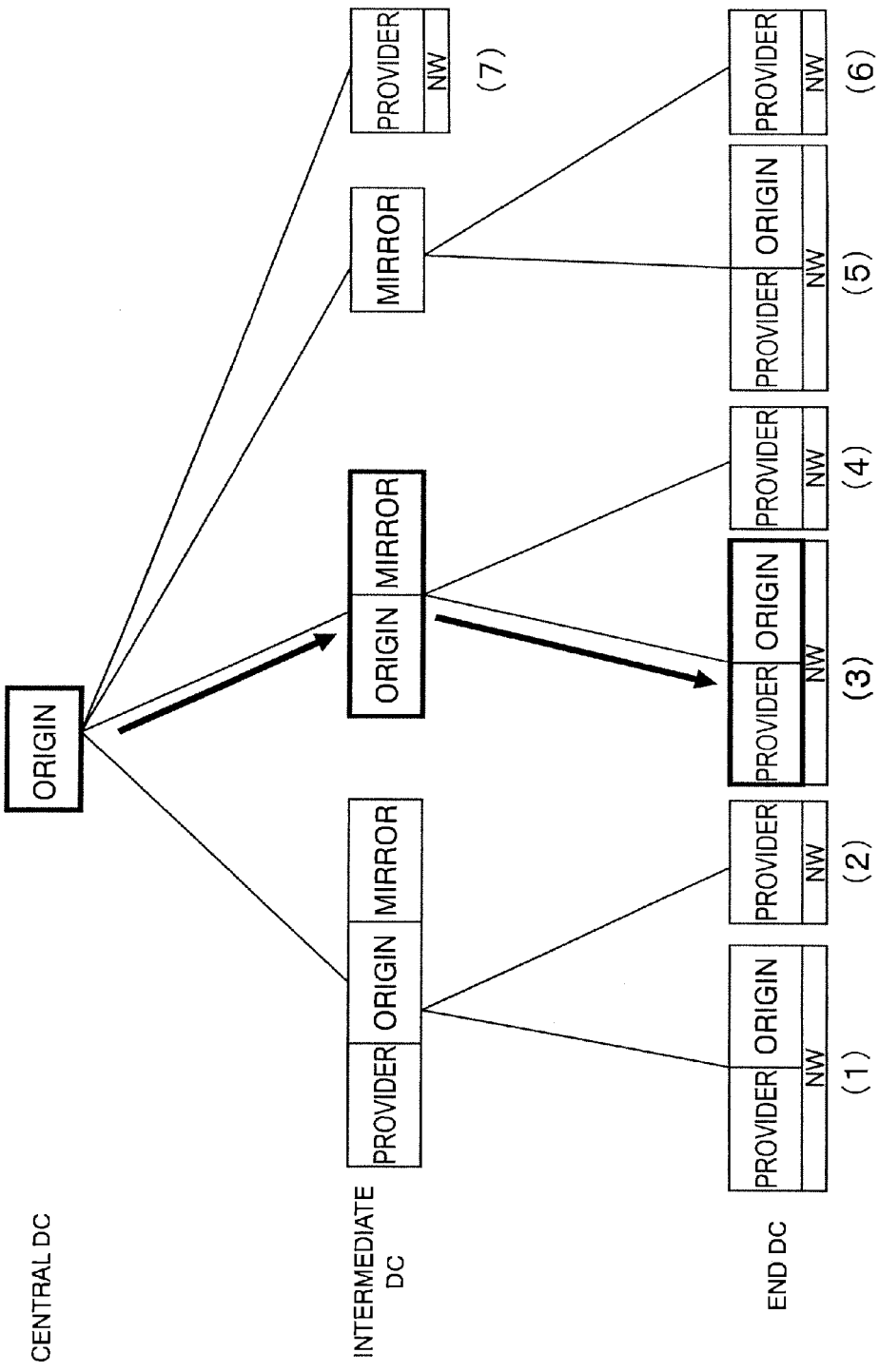
FIG. 20 illustrates possible combinations of each DC and planes.

FIG. 20 illustrates combinations of each DC and planes. In this example, a central DC has only an origin plane(s). That is, the central DC exists not as an operator that directly has end users, but as a service archiver that accumulates many application service providers and content service providers.

In this example, every intermediate DC has at least a mirror plane among the three types of planes, except for the case (7). In addition to a mirror plane, an intermediate DC can have a provider plane with a network (NW) when direct service provision to end users is desired. In this example, every end DC has a provider plane with an NW that provides a service by a copy being from an upper-level DC.

Both intermediate and end DCs can have an origin plane as with the central DC by inviting their own application service provider and/or content service provider.

Summarizing the above example, as shown in FIG. 20, the central DC can have one combination of planes; an intermediate DC can have three combinations of planes, except for the case (7); and an end DC can have two combinations of planes. If DCs are arranged in a three-layer tree structure in this example, there can be seven configurations of service planes as shown in the figure. An origin plane of an end DC is to be an origin and provider plane having connections to end users.

Figure 21:
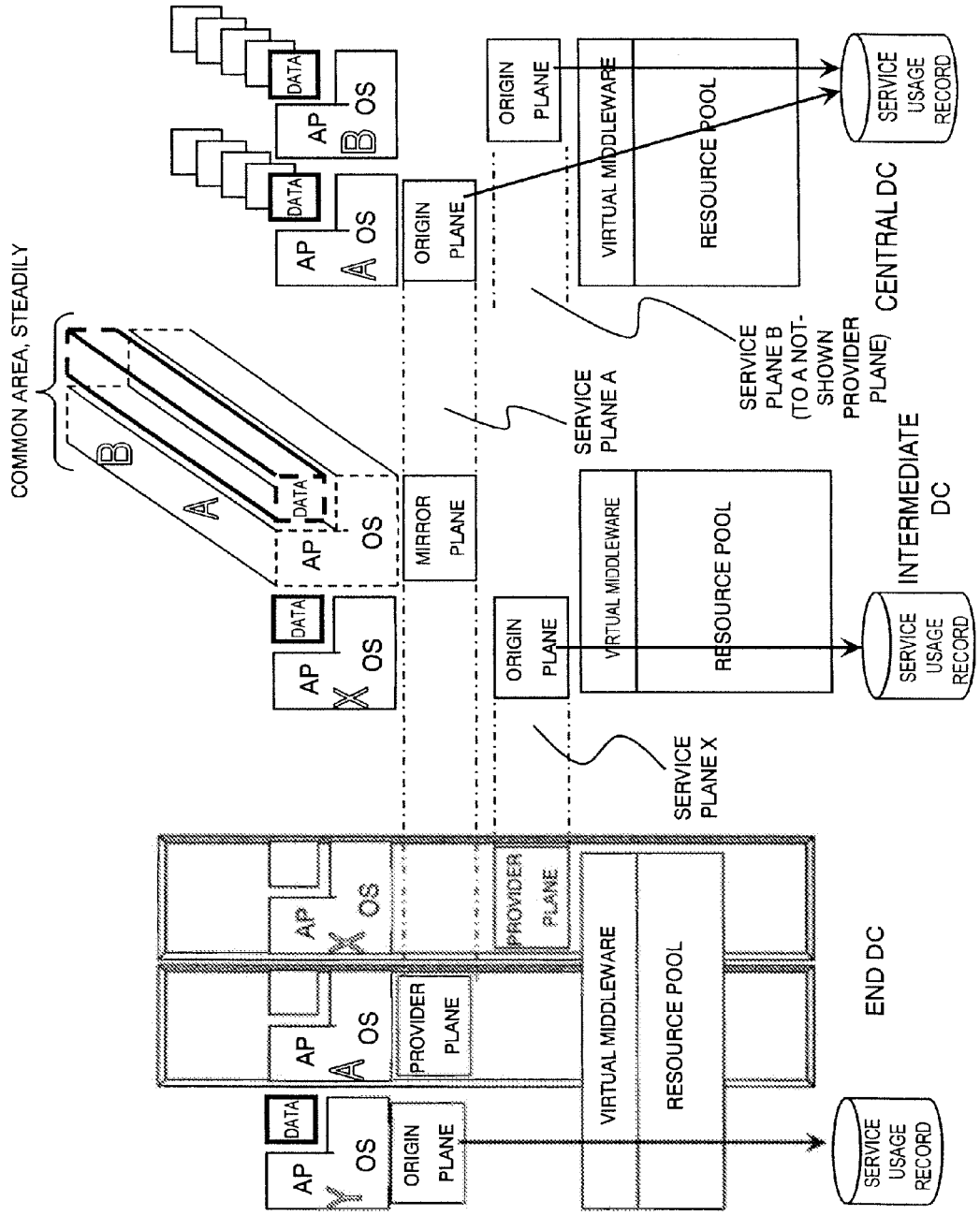
FIG. 21 illustrates the state of the system for the case (3) in FIGS. 20.

FIG. 21 illustrates an example of the state of the system for the case (3) in FIG. 20.

Figure 22:
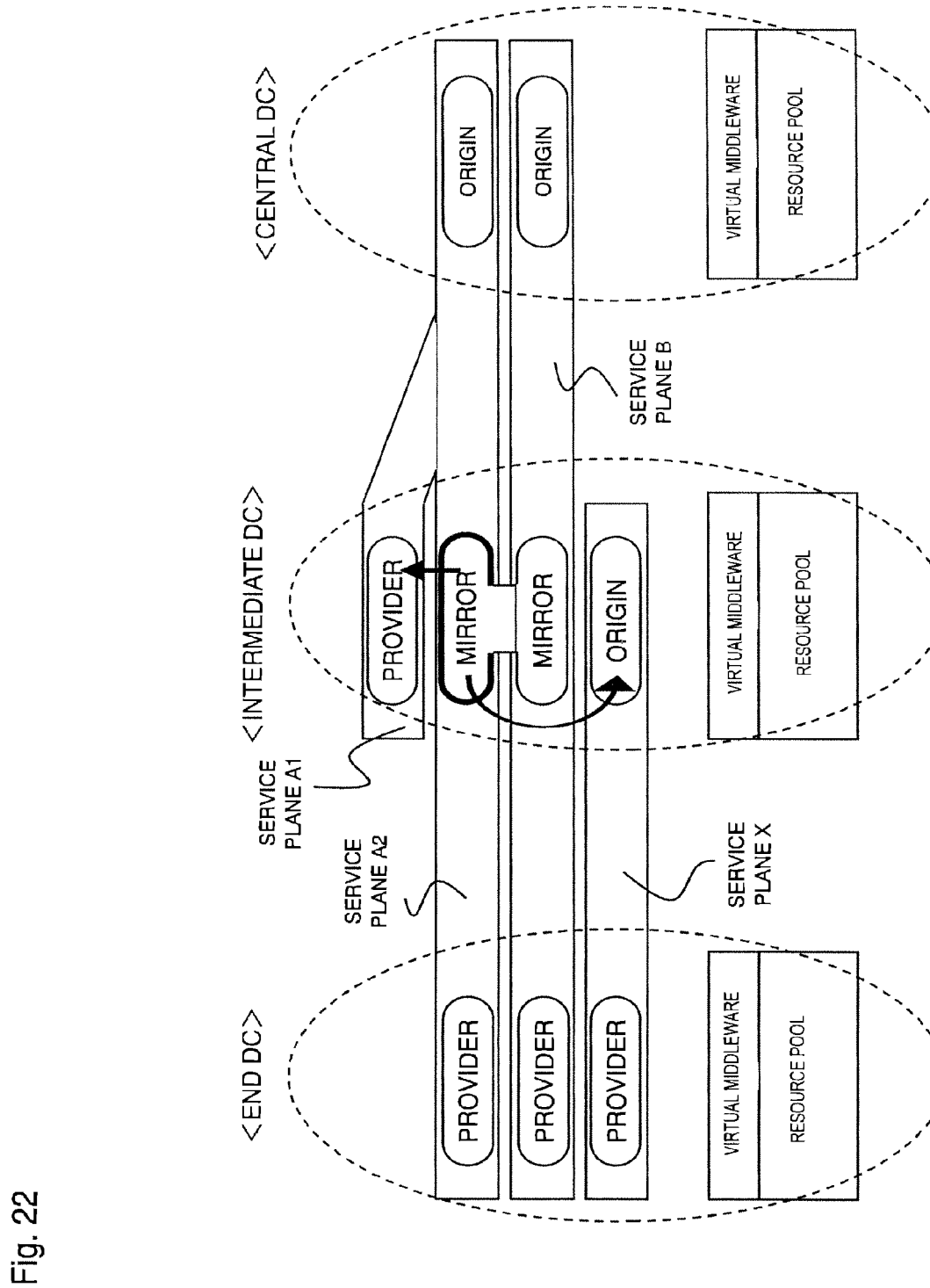
FIG. 22 illustrates an example where resources are shared among planes.

FIG. 22 illustrates a case where the present system has the function to share resources of a DC among service planes.

For example, a process will be described that can be performed in an intermediate DC when, as in FIG. 21, the intermediate DC newly establishes an origin plane so as to newly start a service X in a state where services A and B are already in operation.

A mirror plane of the intermediate DC is commonly used for moving the services A and B to end DCs (an end DC for the service B is not shown in the figure). The application of the service A has already been moved to the end DC, and mirroring data holding period written in "application delivery condition" information has also passed.

In this case, part of the mirror plane including resources that have so far been allocated to mirroring the service A is diverted to a plane for another service (an origin plane for a service X, in this example).

If planes used by services that are different from each other cooperate with each other in an identical DC as above, the DC in the middle of a delivery route of one service can more easily become a providing origin of another service.

For another example, when, as in FIG. 14, in a state where an intermediate DC is already being operated as a mirror plane for services A and B and is also already being operated as a provider plane for the service A, access to the service A from end users that are directly accommodated in the intermediate DC suddenly increases and the provider plane for the service A starts to run short of resources, the following process can be performed in the intermediate DC.

The intermediate DC diverts part of the mirror plane for the service A, which has been originally allocated as a common use area for mirroring to an end DC, to the provider plane for the service A. In this diversion, when the application of the service A has already been moved to the end DC, and mirroring data holding period written in "application delivery condition" information has also passed, resources for the mirror plane that have come off priority occupation are diverted to another service plane.

In FIG. 22, the three services A, B, and X are formed in tree structures, and these tree structures are configured as separate service planes. If one plane runs short of resources in an identical DC, between-plane cooperation is made in which resources for another plane that need not occupy them any more are passed to make up for the shortage. The same holds between a mirror plane (on a service plane A2) and a provider plane (on a service plane A1) that correspond to an identical origin plane.

The achievement of superimposition of services having cooperative relation to each other by means of such dynamic optimum distribution of resources can be realized because the three types of planes are formed on common virtual middleware.

The present system allows, for example, operators of each DC to run the following businesses. Roughly speaking, a near-center DC may provide many users with contents of the same kind, whereas a near-end DC may provide each group of a small number of users with contents of a different kind per group.

First, an operator of a central DC can distribute contents on a national level and can provide, for example, nationwide TV spot commercials, PR videos for movies or the like, repeated delivery of movies and TV programs, shopping channels, online games for versatile gaming machines, archives of major-label content holders, and the like.

Secondly, an operator of an intermediate DC can provide, for example, TV commercials for carriers or carrier operating services, associated contents tied to events or infomercials, online games on carrier APIs, archives of minor-label content holders, and the like.

Thirdly, an operator of an end DC can distribute region-specific contents and can provide, for example, local TV commercials, local cable TVs' own programs, PR or publicity videos for municipalities or the like, archives of local-label content holders, and the like.

Persons of ordinary skill in the art will realize that many modifications and variations of the above embodiments may be made without departing from the novel and advantageous features of the present invention. Accordingly, all such modifications and variations are intended to be included within the scope of the appended claims. The specification and examples are only exemplary. The following claims define the true scope and spirit of the invention.

What is claimed is:

1. A service box to be installed in an end-user accommodation apparatus having a unit configured to connect with a terminal of an end user, wherein
the end-user accommodation apparatus is included in a system for providing service that further includes:
a first service anchor apparatus having a unit configured to hold an original of a first application program for providing a first service; and
a relay apparatus located on a route between the first service anchor apparatus and the end-user accommodation apparatus, the relay apparatus additionally operating as a second service anchor apparatus having a unit configured to hold an original of a second application program for providing a second service different from the first service, and
the system includes a mechanism configured to create, via the relay apparatus, a copy of the first application program in the end-user accommodation apparatus, the original of the first application program being held by the first service anchor apparatus, and to create a copy of the second application program in the end-user accommodation apparatus the original of the second application program being held by the second service anchor apparatus,
the service box for the first service comprising:
a unit that stores information for accessing the first service anchor apparatus; and
resources for being used in providing the first service to the terminal of the end user, wherein
in response to installation into the end-user accommodation apparatus where a determination is to provide the first service and by use of the information and the resources, a copy of the first application program is created in the end-user accommodation apparatus by the mechanism and the first service is provided to the terminal of the end user by running said copy,
the service box for the second service comprising:
a unit that stores information for accessing the second service anchor a apparatus; and
resources for being used in providing the second service to the terminal of the end user, wherein
in response to installation into the end-user accommodation apparatus where a determination is to provide the second service and by use of the information and the resources, a copy of the second application program is created in the end-user accommodation apparatus by the mechanism and the second service is provided to the terminal of the end user by running said copy.

2. The service box according to claim 1, wherein
the service box for the first service further comprising
a unit that stores software to request an application program from the first service anchor apparatus based on said information for accessing the first service anchor apparatus, and
the service box for the second service further comprising
a unit that stores software to request an application program from the second service anchor apparatus based on said information for accessing the second service anchor apparatus.

3. A system for providing service, comprising:
a first service anchor apparatus having a unit configured to hold an original of a first application program for providing a first service;
an end-user accommodation apparatus having a unit configured to connect with a terminal of an end user; and
a relay apparatus located on a route between the first service anchor apparatus and the end-user accommodation apparatus, the relay apparatus additionally operating as a second service anchor apparatus having a unit configured to hold an original of a second application program for providing a second service different from the first service, wherein
the system includes a mechanism configured to create, via the relay apparatus, a copy of the first application program in the end-user accommodation apparatus, the original of the first application program being held by the first service anchor apparatus, and to create a copy of the second application program in the end-user accommodation apparatus, the original of the second application program being held by the second service anchor apparatus, and
the end-user accommodation apparatus comprises:
a unit configured to refer to information stored in a module for a determined service, the module having been installed in the end-user accommodation apparatus in connection with determination that the end-user accommodation apparatus provides the terminal of the end user with the determined service among the first and second services, to acquire information for accessing a service anchor apparatus of the determined service; and a unit configured to run a copy of an application program of the determined service, said copy being created in the end-user accommodation apparatus by the mechanism, thereby providing the determined service to the terminal of the end user.

4. The system according to claim 3, wherein
virtual middleware is installed in apparatuses including the first service anchor apparatus, the end-user accommodation apparatus, and the relay apparatus additionally operating as the second service anchor apparatus, whereby an identical copy of the application program can run on more than one of the apparatuses.

5. The system according to claim 3, wherein the mechanism
creates, while the original of the first application program is being run on the first service anchor apparatus, a copy of the running first application program in the relay apparatus;
creates, while the copy of the first application program is being run on the relay apparatus, a further copy of the running first application program in the end-user accommodation apparatus; and
causes the further copy of the first application program to start running on the end-user accommodation apparatus, taking over running of the original of the first application program, whereas the original of the first application program continues to run on the first service anchor apparatus.

6. The system according to claim 3, wherein
in response to the end-user accommodation apparatus requesting an application program from the first service anchor apparatus based on the information for accessing the service anchor apparatus, a copy of the first application program is created in the end-user accommodation apparatus, and
in response to the end-user accommodation apparatus requesting an application program from the second service anchor apparatus based on the information for accessing the service anchor apparatus, a copy of the second application program is created in the end-user accommodation apparatus.

7. The system according to claim 3, wherein
a service box containing the module for the first service stores software to request an application program from the first service anchor apparatus and is equipped with resources for being used in providing the service to the terminal of the end user, and
a service box containing the module for the second service stores software to request an application program from the second service anchor apparatus and is equipped with resources for being used in providing the second service to the terminal of the end user.

8. The system according to claim 3, wherein the relay apparatus that functions as the second service anchor apparatus comprises:
first software to create a copy of the first application program associated with the first service in the end-user accommodation apparatus, the original of the first application program being held by the first service anchor apparatus;
second software to create a copy of the second application program associated with the second service in the end-user accommodation apparatus, the original of the second application program being held by the relay apparatus; and a unit configured to allocate at least a part of resources that have been used by the first software to the second software.

9. The system according to claim 3, wherein
the relay apparatus has a unit configured to connect with a terminal of a second end user other than said end user, and functions as a second end-user accommodation apparatus.

10. The system according to claim 9, wherein the relay apparatus that functions as the second end-user accommodation apparatus comprises:
first software to create a copy of the first application program associated with the first service in the end-user accommodation apparatus, the original of the first application program being held by the first service anchor apparatus;
second software to run a copy of the first application program, the copy having been created in the relay apparatus, thereby providing the first service to the terminal of the second end user; and
a unit configured to allocate at least a part of resources that have been used by the first software to the second software.

11. The system according to claim 3, wherein
the first service anchor apparatus further has a unit configured to store information to specify the end-user accommodation apparatus and the relay apparatus, and
the mechanism includes:
a unit configured in the first service anchor apparatus to create a copy of the first application program in the relay apparatus with the information added to the copy;
a unit configured in the relay apparatus to create a further copy of the first application program in a copying destination that is the end-user accommodation apparatus or another relay apparatus closer to the end-user accommodation apparatus, the copying destination being determined with reference to the information.

12. The system according to claim 3, wherein the relay apparatus has:
a unit configured to hold a copy of the first application program created in the relay apparatus;
a unit configured to check whether the copy of the first application program is held or not, in response to receiving a request for the first application program from a second end-user accommodation apparatus other than said end-user accommodation apparatus to the first service anchor apparatus;
a unit configured to transfer the request to the first service anchor apparatus if the copy is not held; and
a unit configured to otherwise use the copy held in the relay apparatus to create a further copy of the first application program in the second end-user accommodation apparatus or in another relay apparatus closer to the second end-user accommodation apparatus.

13. The system according to claim 3, wherein
the end-user accommodation apparatus further has a unit configured to acquire additional information for accessing the relay apparatus located between the first service anchor apparatus and the end-user accommodation apparatus, wherein
the mechanism for the first application program includes:
a unit configured in the end-user accommodation apparatus to transmit a request to the relay apparatus based on the additional information; and
a unit configured in the relay apparatus to create a copy of the first application program in the end-user accommodation apparatus or in another relay apparatus closer to the end-user accommodation apparatus, in response to the request.

14. The system according to claim 3, wherein the first service anchor apparatus further has:
a unit configured to hold an original of first data that can be used by the first service; and
a unit configured to create a copy of the first data to he received by the end-user accommodation apparatus, referring to information for specifying the end-user accommodation as apparatus where a determination is to provide the first service,
the relay apparatus that functions as the second service anchor apparatus further has:
a unit configured to hold an original of second data that can be used by the second service; and
a unit configured to create a copy of the second data to be received by the end-user accommodation apparatus, referring to information for specifying the end-user accommodation apparatus where a determination is to provide the second service, and
the end-user accommodation apparatus receives the copy of data of the determined service and makes the copy of the data available to the copy of the application program in the end-user accommodation apparatus, thereby providing the determined service with regard to data chosen by the end user.

15. The system according to claim 3, wherein the end-user accommodation apparatus further has:
a unit configured to request a latest version of data, an original of the data being held in the service anchor apparatus of the determined service; to receive a copy of the latest version of the data in response to the request; and to store the copy of the data as data that can be used by the copy of the application program of the determined service in the end-user accommodation apparatus; and
a unit configured to cause the copy of the application program to refer to the original of the data held in the service anchor apparatus of the determined service.

16. The system according to claim 3, wherein the end-user accommodation apparatus further has
a unit configured to output usage information obtained through providing the determined service to the terminal of the end user, toward the service anchor apparatus of the determined service, based on the information for accessing the service anchor apparatus,
the first service anchor apparatus records usage of the first service for each end user based on the usage information outputted from the end-user accommodation apparatus, and
the second service anchor apparatus records usage of the second service for each end user based on the usage information outputted from the end-user accommodation apparatus.

17. A method of providing service in a system, wherein the system includes:
a first service anchor apparatus having a unit configured to hold an original of a first application program for providing a first service;
an end-user accommodation apparatus having a unit configured to connect with a terminal of an end user; and
a relay apparatus located on a route between the first service anchor apparatus and the end-user accommodation apparatus, the relay apparatus additionally operating as a second service anchor apparatus having a unit configured to hold an original of a second application program for providing a second service different from the first service, wherein
the system includes a mechanism configured to create, via the relay apparatus, a copy of the first application program in the end-user accommodation apparatus, the original of the first application program being held by the first service anchor apparatus, and to create a copy of the second application program in the end-user accommodation as apparatus the on final of the second application program being held by the second service anchor apparatus,
the method comprising:
having a module for the first service installed in the end-user accommodation apparatus where a determination is to provide the first service to the terminal of the end user, having a module for the second service installed in the end-user accommodation apparatus where a determination is to provide the second service to the terminal of the end user;
acquiring information for accessing a service anchor apparatus of the service determined to provide by the end-user accommodation apparatus, referring to information stored in the module installed in the end-user accommodation apparatus;
having a copy of an application program of the service determined to provide by the end-user accommodation apparatus created in the end-user accommodation apparatus, based on the acquired information; and
running the copy of the application program created in the end-user accommodation apparatus, thereby providing the determined service to the terminal of the end user.

18. The method of claim 17, further comprising
outputting usage information obtained through providing the determined service to the terminal of the end user by the end-user accommodation apparatus, toward the service anchor apparatus of the determined service, based on the acquired information.

19. A non-transitory computer usable medium having computer readable program codes embodied therein to be incorporated into a computer, whereby the computer functions as an end-user accommodation apparatus having a unit configured to connect with a terminal of an end user in a system for providing service, the system comprising:
a first service anchor apparatus having a unit configured to hold an original of a first application program for providing a first service; and
a relay apparatus located on a route between the first service anchor apparatus and the end-user accommodation apparatus, the relay apparatus additionally operating as a second service anchor apparatus having a unit configured to hold an original of a second application program for providing a second service different from the first service, wherein
the system includes a mechanism configured to create, via the relay apparatus, a copy of the first application program in the end-user accommodation apparatus, the original of the first application program being held by the first service anchor apparatus, and to create a copy of the second application program in the end-user accommodation apparatus, the original of the second application program being held by the second service anchor apparatus,
the computer readable program codes comprising:
first codes causing the computer to refer to information stored in a module for a determined service, the module having been installed in the end-user accommodation apparatus in connection with determination that the end-user accommodation apparatus provides the terminal of the end user with the determined service among the first and second services, to acquire information for accessing a service anchor apparatus of the determined service;

second codes causing the computer to send a request of an application program toward the service anchor apparatus of the determined service in accordance with the information; and third codes causing the computer to run a copy of the application program of the determined service, said copy being created in the end-user accommodation apparatus in response to the request, thereby providing the determined service to the terminal of the end user.

* * * * *